(12) United States Patent
Tamersoy et al.

(10) Patent No.: US 9,148,441 B1
(45) Date of Patent: Sep. 29, 2015

(54) SYSTEMS AND METHODS FOR ADJUSTING SUSPICIOUSNESS SCORES IN EVENT-CORRELATION GRAPHS

(71) Applicant: Symantec Corporation, Mountain View, CA (US)

(72) Inventors: Acar Tamersoy, Atlanta, GA (US); Kevin Roundy, El Segundo, CA (US); Sandeep Bhatkar, Sunnyvale, CA (US); Elias Khalil, Atlanta, GA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/138,891

(22) Filed: Dec. 23, 2013

(51) Int. Cl.
*H04L 29/06* (2006.01)
*G06F 21/57* (2013.01)

(52) U.S. Cl.
CPC .......... *H04L 63/1416* (2013.01); *G06F 21/577* (2013.01); *H04L 63/1425* (2013.01)

(58) Field of Classification Search
CPC ............ H04L 63/1416; H04L 63/1415; G06F 21/577
USPC ..................................................... 726/23, 25
See application file for complete search history.

(56) References Cited

U.S. PATENT DOCUMENTS

| 7,861,300 | B2 | 12/2010 | Arnold et al. | |
|---|---|---|---|---|
| 8,104,090 | B1 | 1/2012 | Pavlyushchik | |
| 8,341,745 | B1* | 12/2012 | Chau et al. | 726/24 |
| 8,566,938 | B1 | 10/2013 | Prakash et al. | |
| 2005/0138413 | A1 | 6/2005 | Lippmann et al. | |
| 2009/0144308 | A1 | 6/2009 | Huie et al. | |
| 2009/0300769 | A1* | 12/2009 | Srinivasa et al. | 726/26 |
| 2010/0115621 | A1* | 5/2010 | Staniford et al. | 726/25 |
| 2010/0186088 | A1 | 7/2010 | Banerjee et al. | |
| 2010/0192226 | A1* | 7/2010 | Noel et al. | 726/23 |
| 2010/0235879 | A1 | 9/2010 | Burnside et al. | |
| 2011/0047620 | A1 | 2/2011 | Mahaffey et al. | |
| 2011/0083180 | A1 | 4/2011 | Mashevsky et al. | |

(Continued)

FOREIGN PATENT DOCUMENTS

| CN | 102571469 | 7/2012 |
|---|---|---|
| CN | 102893289 | 1/2013 |
| EP | 2515250 | 10/2012 |

OTHER PUBLICATIONS

Bruce McCorkendale, et al; Systems and Methods for Detecting Malware; U.S. Appl. No. 13/422,702, filed Mar. 16, 2012.

(Continued)

*Primary Examiner* — Dao Ho
(74) *Attorney, Agent, or Firm* — ALG Intellectual Property, LLC

(57) ABSTRACT

A computer-implemented method for adjusting suspiciousness scores in event-correlation graphs may include (1) detecting a suspicious event involving a first actor and a second actor within a computing system, (2) constructing an event-correlation graph that includes (i) a representation of the first actor, (ii) a representation of the suspicious event, and (iii) a representation of the second actor, and (3) adjusting a suspiciousness score associated with at least one representation in the event-correlation graph based at least in part on a suspiciousness score associated with at least one other representation in the event-correlation graph such that the adjusted suspiciousness score associated with the at least one representation is influenced by the suspicious event. Various other methods, systems, and computer-readable media are also disclosed.

20 Claims, 15 Drawing Sheets

(56) References Cited

U.S. PATENT DOCUMENTS

2013/0042294 A1 2/2013 Colvin et al.
2013/0333032 A1 12/2013 Delatorre et al.
2014/0365646 A1 12/2014 Xiong

OTHER PUBLICATIONS

Paleari, Roberto et al., "Automatic Generation of Remediation Procedures for Malware Infections", https://www.usenix.org/legacy/event/sec10/tech/full_papers/Paleari.pdf, as accessed Feb. 6, 2014, USENIX Security'10 Proceedings of the 19th USENIX conference on Security, USENIX Association, Berkeley, CA, (2010).
"Combating Advanced Persistent Threats—How to prevent, detect, and remediate APTs", http://www.mcafee.com/us/resources/white-papers/wp-combat-advanced-persist-threats.pdf, as accessed Feb. 6, 2014, McAfee, Inc., Santa Clara, CA, (2011).
"Advanced Persistent Threat (APT) Attack & Zero-Day Protection", http://www.fireeye.com/, as accessed Feb. 6, 2014, FireEye, Inc., (2006).
"Advanced Threat Defense", http://www.fidelissecurity.com/advanced-persistent-threat-protection, as accessed Feb. 6, 2014, General Dynamics Fidelis Cybersecurity Solutions, Inc., (2013).
"Mandiant for Security Operations", https://www.mandiant.com/products/mandiant-platform/security-operations, as accessed Feb. 6, 2014, Mandiant, A FireEye Company, (Mar. 1, 2013).
"Mandiant for Intelligent Response", http://www.mandiant.com/products/mandiant-platform/intelligent-response, as accessed Feb. 6, 2014, Mandiant, A FireEye Company, (Mar. 1, 2013).
"Solera Networks Inc.", http://www.soleranetworks.com/, as accessed Feb. 6, 2014, (Feb. 16, 2005).
"LogRhythm, Inc.", http://www.logrhythm.com/, as accessed Feb. 6, 2014, (Oct. 18, 2000).
Kevin Alejandro Roundy, et al; Systems and Methods for Using Event-Correlation Graphs to Generate Remediation Procedures; U.S. Appl. No. 14/221,703, filed Mar. 21, 2014.
Kevin Roundy, et al; Systems and Methods for Using Event-Correlation Graphs to Detect Attacks on Computing Systems; U.S. Appl. No. 14/041,762, filed Sep. 30, 2013.
Fanglu Guo, et al; Systems and Methods for Reducing False Positives When Using Event-Correlation Graphs to Detect Attacks on Computing Systems; U.S. Appl. No. 14/031,044, filed Sep. 19, 2013.
Adam Glick, et al; Systems and Methods for User-Directed Malware Remediation; U.S. Appl. No. 13/419,360, filed Mar. 13, 2012.
Carey Nachenberg, et al; Systems and Methods for Neutralizing File-Format-Specific Exploits Included Within Files Contained Within Electronic Communications; U.S. Appl. No. 13/418,332, filed Mar. 12, 2012.
Leylya Yumer, et al; Systems and Methods for Analyzing Zero-Day Attacks; U.S. Appl. No. 13/901,977, filed May 24, 2013.
Lee, Kyumin et al., "Content-Driven Detection of Campaigns in Social Media", http://faculty.cs.tamu.edu/caverlee/pubs/lee11cikm.pdf, as accessed Aug. 8, 2013, CIKM'11; ACM; Glasgow, Scotland, UK, (Oct. 2011).
Bhuyan, Monowar H., et al., "AOCD: An Adaptive Outlier Based Coordinated Scan Detection Approach", http://www.cs.uccs.edu/~jkalita/papers/2012/BhuyanMonowarIJNS2012.pdf, as accessed Aug. 8, 2013, International Journal of Network Security; vol. 14, No. 6, (Nov. 2012), 339-351.
Eberle, William et al., "Graph-based approaches to insider threat detection", http://dl.acm.org/citation.cfm?id=1558658, as accessed Aug. 8, 2013, CSIIRW '09 Proceedings of the 5th Annual Workshop on Cyber Security and Information Intelligence Research: Cyber Security and Information Intelligence Challenges and Strategies; Article No. 44; ACM; (2009).
Splunk, Inc., "Detecting Advanced Persistent Threats—Using Splunk for APT", http://www.splunk.com/web_{13} assets/pdfs/secure/Splunk_for_APT_Tech_Brief.pdf, as accessed Aug. 8, 2013, Tech Brief, (Jan. 4, 2012).

Triumfant, Inc., "Detecting the Advanced Persistent Threat", www.triumfant.com/advanced_persistent_threat.asp, as accessed Aug. 8, 2013, (Nov. 30, 2010).
EMC Corporation, "Advanced Persistent Threat (APT) and Rootkit Detection", http://www.siliciumsecurity.com/advanced-persistent-threats-and-rootkits-detection/, as accessed Aug. 8, 2013, (2012).
Colombe, Jeffrey B., et al., "Statistical profiling and visualization for detection of malicious insider attacks on computer networks", http://dl.acm.org/citation.cfm?id=1029231, as accessed Nov. 13, 2013, VizSEC/DMSEC '04 Proceedings of the 2004 ACM workshop on Visualization and data mining for computer security, ACM, New York, NY, (2004),138-142.
Wang, Wei et al., "Diffusion and graph spectral methods for network forensic analysis", http://dl.acm.org/citation.cfm?id=1278956, as accessed Nov. 13, 2013, NSPW '06 Proceedings of the 2006 workshop on New security paradigms, ACM, New York, NY, (2006), 99-106.
Julisch, Klaus, "Clustering intrusion detection alarms to support root cause analysis", http://dl.acm.org/citation.cfm?id=950192, as accessed Nov. 13, 2013, ACM Transactions on Information and System Security (TISSEC), vol. 6, Issue 4, ACM, New York, NY, (Nov. 2003), 443-471.
Treinen, James J., et al., "A framework for the application of association rule mining in large intrusion detection infrastructures", http://dl.acm.org/citation.cfm?id=2166375, as accessed Nov. 13, 2013, RAID'06 Proceedings of the 9th international conference on Recent Advances in Intrusion Detection, Springer-Verlag Berlin, Heidelberg, (2006), 1-18.
Gu, Guofei, et al., "BotHunter: detecting malware infection through IDS-driven dialog correlation", http://dl.acm.org/citation.cfm?id=1362915, as accessed Nov. 13, 2013, SS'07 Proceedings of 16th USENIX Security Symposium on USENIX Security Symposium, Article No. 12, USENIX Association, Berkeley, CA, (2007).
Valdes, Alfonso et al., "Probabilistic Alert Correlation", http://dl.acm.org/citation.cfm?id=670734, as accessed Nov. 13, 2013, RAID '00 Proceedings of the 4th International Symposium on Recent Advances in Intrusion Detection, Springer-Verlag, London, UK, (2001), 54-68.
Alsubhi, Khalid et al., "FuzMet: a fuzzy-logic based alert prioritization engine for intrusion detection systems", http://dl.acm.org/citation.cfm?id=2344711, as accessed Nov. 13, 2013, International Journal of Network Management, vol. 22 Issue 4, John Wiley & Sons, Inc., New York, NY, (Jul. 2012).
Zamlot, Loai et al., "Prioritizing intrusion analysis using Dempster-Shafer theory", http://dl.acm.org/citation.cfm?id=2046694, as accessed Nov. 13, 2013, AlSec '11 Proceedings of the 4th ACM workshop on Security and artificial intelligence, ACM, New York, NY, (2011), 59-70.
Oliner, Adam J., et al., "Community epidemic detection using time-correlated anomalies", http://dl.acm.org/citation.cfm?id=1894191, as accessed Nov. 13, 2013, RAID'10 Proceedings of the 13th international conference on Recent advances in intrusion detection, Springer-Verlag Berlin, Heidelberg, (2010), 360-381.
Ning, Peng et al., "Constructing attack scenarios through correlation of intrusion alerts", http://reeves-students.csc.ncsu.edu/papers-and-other-stuff/2002-10-ccs-constructing-attack-scenarios-paper.pdf, as accessed Nov. 13, 2013, CCS '02 Proceedings of the 9th ACM conference on Computer and communications security, ACM, Washington, DC, (Nov. 18-22, 2002), 245-254.
Wang, Wei et al., "A Graph Based Approach Toward Network Forensics Analysis", http://dl.acm.org/citation.cfm?id=1410238, as accessed Nov. 13, 2013, ACM Transactions on Information and System Security (TISSEC), vol. 12, Issue 1, Article No. 4, ACM, New York, NY, (Oct. 2008).
Valeur, Fredrik et al., "A Comprehensive Approach to Intrusion Detection Alert Correlation", http://dl.acm.org/citation.cfm?id=1038251, as accessed Nov. 13, 2013, IEEE Transactions on Dependable and Secure Computing, vol. 1, Issue 3, IEEE Computer Society Press, Los Alamitos, CA, (Jul. 2004), 146-169.
Tedesco, Gianni et al., "Real-Time Alert Correlation with Type Graphs", http://dl.acm.org/citation.cfm?id=1496279, as accessed

(56) References Cited

OTHER PUBLICATIONS

Nov. 13, 2013, ICISS '08 Proceedings of the 4th International Conference on Information Systems Security, Springer-Verlag Berlin, Heidelberg, (2008), 173-187.

Wang, Wei et al., "Network Forensics Analysis with Evidence Graphs", http://www.dfrws.org/2005/proceedings/wang_evidencegraphs.pdf, as accessed Nov. 13, 2013, 2005 Digital Forensic Research Workshop (DFRWS), New Orleans, LA, (2005).

Wang, Ting et al., "Microscopic Social Influence", http://www.cc.gatech.edu/~lingliu/papers/2012/TingWang-SDM2012.pdf, as accessed Nov. 13, 2013, SDM 2012, (2012).

Ugander, Johan et al., "Balanced Label Propagation for Partitioning Massive Graphs", https://people.cam.cornell.edu/~jugander/papers/wsdm13-blp.pdf, as accessed Nov. 13, 2013, WSDM'13, ACM, Rome, Italy, (Feb. 4-8, 2013).

Ayday, Erman et al., "Iterative Trust and Reputation Management Using Belief Propagation", http://www.ece.gatech.edu/research/labs/WCCL/BP_publications/BP-ITRM-journal.pdf, as accessed Nov. 13, 2013, IEEE Transactions on Dependable and Secure Computing, vol. 9, No. 3, IEEE Computer Society, (May/Jun. 2012), 375-386.

Eberle, William et al., "Insider Threat Detection Using Graph-Bases Approaches", http://www.eecs.wsu.edu/-holder/pubs/EberleCATCH09.pdf, Cybersecurity Applications & Technology Conference for Homeland Security,(Jan. 2009).

Constantin, Lucian, "Attackers used known exploit to steal customer log-in credentials, vBulletin maker says", http://www.networkworid.com/article/2171967/access-control/attackers-used-known-exploit-to-steal-customer-log-in-credentials--vbulletin-maker-sa.html, IDG News Service, Network World, (Nov. 18, 2013).

"Recovery Manager for Active Directory Forest Edition", http://software.dell.com/documents/recovery-manager-for-active-directory-forest-edition-datasheet-26622.pdf, Dell, Inc., (Nov. 2013).

Scarfone, Karen et al., "Guide to Intrusion Detection and Prevention Systems (IDPS)", http://csrc.nist.gov/publications/nistpubs/800-94/SP800-94, National Institute of Standards and Technology, Special Publication 800-94, (Feb. 2007).

Dezert, Jean et al., "On the Validity of Dempster-Shafer Theory", Fusion 2012—15th International Conference on Information Fusion, Singapour, Singapore, (Jul. 2012).

* cited by examiner

SYSTEMS AND METHODS FOR ADJUSTING SUSPICIOUSNESS SCORES IN EVENT-CORRELATION GRAPHS

BACKGROUND

In recent years, malicious programmers have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as financial information, defense-related information, and/or intellectual property (e.g., source code), and/or to simply disrupt an entity's operations.

Many security software companies attempt to combat targeted attacks by creating and deploying malware signatures (e.g., hash functions that uniquely identify known malware) to their customers on a regular basis. However, a significant number of the above-mentioned attacks involve malware that has been carefully crafted to take advantage of an as-yet-undiscovered vulnerability of a particular application (commonly known as a "zero-day" exploit). As such, these attacks are often difficult for traditional security software to detect and/or neutralize since the exploits in question have yet to be publicly discovered.

In addition to or as an alternative to a signature-based approach, some security software companies may apply a variety of behavior-based heuristics to detect targeted attacks. Unfortunately, a significant number of targeted attacks (e.g., advanced persistent threats) may move at a slow pace such that traditional security software may be unable to distinguish individual malicious behaviors of the targeted attacks from legitimate behaviors. Accordingly, the instant disclosure identifies and addresses a need for systems and methods for adjusting suspiciousness scores in event-correlation graphs.

SUMMARY

As will be described in greater detail below, the instant disclosure generally relates to systems and methods for adjusting the suspiciousness scores of actors and/or suspicious events based on how the actors and/or suspicious events are related within an event-correlation graph such that an attack involving the actors and/or suspicious events may be detected and/or better understood. In one example, a computer-implemented method for adjusting suspiciousness scores in event-correlation graphs may include (1) detecting a suspicious event involving a first actor and a second actor within a computing system, (2) constructing, in response to detecting the suspicious event involving the first actor and the second actor, an event-correlation graph that includes (i) a representation (e.g., a node) of the first actor, (ii) a representation (e.g., a node) of the suspicious event that may be interconnected (e.g., by a directed edge) with the representation of the first actor, and (iii) a representation (e.g., a node) of the second actor that may be interconnected (e.g., by a directed edge) with the representation of the suspicious event, and (3) adjusting a suspiciousness score associated with at least one representation in the event-correlation graph based at least in part on a suspiciousness score associated with at least one other representation in the event-correlation graph such that the adjusted suspiciousness score associated with the at least one representation is influenced by the suspicious event.

In some embodiments, the representation of the first actor may be associated with a suspiciousness score of the first actor that may indicate a likelihood that the first actor may be malicious, the representation of the suspicious event may be associated with a suspiciousness score of the suspicious event that may indicate a likelihood that the suspicious event may be malicious, and the representation of the second actor may be associated with a suspiciousness score of the second actor that may indicate a likelihood that the second actor may be malicious.

In some embodiments, the representation of the first actor may include a first node, the representation of the suspicious event may include a second node, the representation of the second actor may include a third node, the first node and the second node may be interconnected by a first edge, and the second node and the third node may be interconnected by a second edge.

In some embodiments, the step of adjusting the suspiciousness score associated with the at least one representation may include (1) determining a prior probability distribution for each node in the event-correlation graph based at least in part on the suspiciousness score associated with the node for which the prior probability distribution is determined, (2) iteratively propagating a probability among the nodes in the event-correlation graph that indicates whether the actor or suspicious event represented by the node is malicious by transmitting messages along the edges in the event-correlation graph, wherein a message transmitted by a transmitting node is generated based at least in part on the prior probability distribution of the transmitting node and messages received by the transmitting node from other nodes in the event-correlation graph during any previous iterations, and (3) adjusting the suspiciousness score associated with the node based at least in part on the probability that indicates whether the actor or suspicious event represented by the node is malicious.

In some embodiments, the computer-implemented method for adjusting suspiciousness scores in event-correlation graphs may also include determining an edge potential for each edge in the event-correlation graph based on a probability that a malicious actor exists within a computing environment within which malware may be prevented, a probability that a benign actor exists within the computing environment within which malware may be prevented, a probability that a malicious event occurs within the computing environment within which malware may be prevented, a probability that a benign event occurs within the computing environment within which malware may be prevented, a probability that a malicious actor exists within a computing environment within which malware may not be prevented, a probability that a benign actor exists within the computing environment within which malware may not be prevented, a probability that a malicious event occurs within the computing environment within which malware may not be prevented, and/or a probability that a benign event occurs within the computing environment within which malware may not be prevented (in this last example, the message transmitted by the transmitting node may be generated based on the edge potential of the edge in the event-correlation graph along which the transmitting node transmits the message).

In some embodiments, the step of adjusting the suspiciousness score associated with the at least one representation may include applying a belief-propagation algorithm, a heat-diffusion algorithm, and/or a label-propagation algorithm to the event-correlation graph.

In some embodiments, the computer-implemented method for adjusting suspiciousness scores in event-correlation graphs may also include (1) calculating, based at least in part on the adjusted suspiciousness score associated with the at least one representation, an attack score for the event-correlation graph, (2) determining that the attack score is greater than a predetermined threshold, (3) determining, based at least in part on the attack score being greater than the predetermined threshold, that the suspicious event may be part of an attack on the computing system, and (4) reporting the attack on the computing system.

In some embodiments, the step of reporting the attack on the computing system may include (1) determining, based at least in part on the adjusted suspiciousness score associated with the at least one representation, that the actor or the suspicious event represented by the at least one representation was a significant factor in the attack on the computing system and (2) emphasizing the actor or the suspicious event represented by the at least one representation based at least in part on the actor or the suspicious event represented by the at least one representation having been a significant factor in the attack on the computing system.

In some embodiments, the step of determining that the actor or the suspicious event represented by the at least one representation was a significant factor in the attack on the computing system may include determining that the suspiciousness score associated with the at least one representation was adjusted by more than an additional predetermined threshold.

In some embodiments, the step of reporting the attack on the computing system may include (1) determining, based at least in part on the adjusted suspiciousness score associated with the at least one representation, that the actor or the suspicious event represented by the at least one representation was not a significant factor in the attack on the computing system and (2) de-emphasizing the actor or the suspicious event represented by the at least one representation based at least in part on the actor or the suspicious event represented by the at least one representation not having been a significant factor in the attack on the computing system.

In some embodiments, the step of constructing the event-correlation graph may include, for each actor within the event-correlation graph, (1) identifying a set of events that involve the actor and at least one additional actor and (2) for each event within the set of events, (i) adding a representation of the additional actor to the event-correlation graph and (ii) adding a representation of the event to the event-correlation graph that may be interconnected with the representation of the actor and the representation of the additional actor. In some embodiments, the set of events may include a set of suspicious events.

In one embodiment, a system for implementing the above-described method may include (1) a detecting module, stored in memory, that detects a suspicious event involving a first actor and a second actor within a computing system, (2) a constructing module, stored in memory, that constructs, in response to detecting the suspicious event involving the first actor and the second actor, an event-correlation graph that includes (i) a representation of the first actor, (ii) a representation of the suspicious event that may be interconnected with the representation of the first actor, and (iii) a representation of the second actor that may be interconnected with the representation of the suspicious event, (3) an adjusting module, stored in memory, that adjusts a suspiciousness score associated with at least one representation in the event-correlation graph based at least in part on the adjusted suspiciousness score associated with at least one other representation in the event-correlation graph such that the suspiciousness score associated with the at least one representation is influenced by the suspicious event, and (4) at least one physical processor that executes the detecting module, the constructing module, and the adjusting module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) detect a suspicious event involving a first actor and a second actor within a computing system, (2) construct, in response to detecting the suspicious event involving the first actor and the second actor, an event-correlation graph that includes (i) a representation of the first actor, (ii) a representation of the suspicious event that may be interconnected with the representation of the first actor, and (iii) a representation of the second actor that may be interconnected with the representation of the suspicious event, and (3) adjust a suspiciousness score associated with at least one representation in the event-correlation graph based at least in part on a suspiciousness score associated with at least one other representation in the event-correlation graph such that the adjusted suspiciousness score associated with the at least one representation is influenced by the suspicious event.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
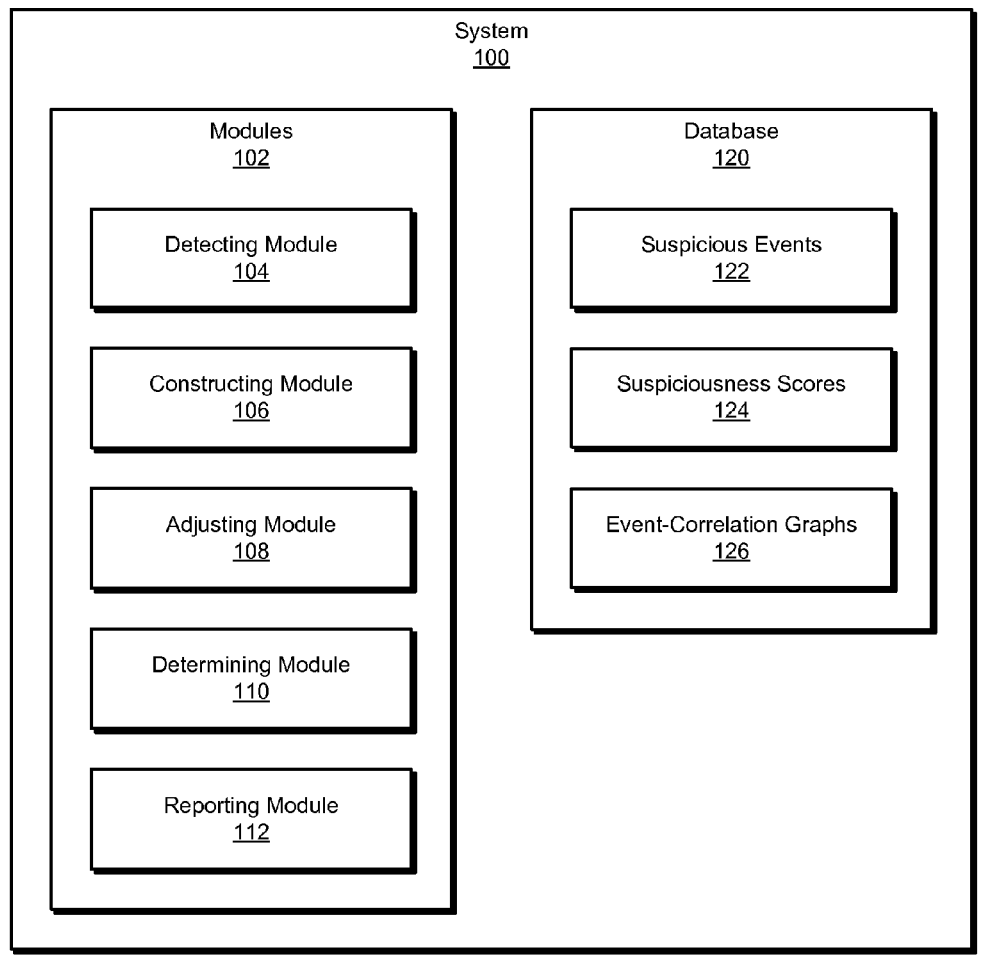
FIG. 1 is a block diagram of an exemplary system for adjusting suspiciousness scores in event-correlation graphs.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for adjusting suspiciousness scores in event-correlation graphs. As will be explained in greater detail below, by adjusting the suspiciousness scores of the actors and/or suspicious events represented in an event-correlation graph based on how the actors and/or suspicious events are interconnected in the event-correlation graph, the systems and methods described herein may improve the detection and understanding of a targeted attack represented by the event-correlation graph. Furthermore, in some examples, by determining the degree to which the suspiciousness score of an actor and/or suspicious event represented in an event-correlation graph is adjusted, these systems and methods may determine whether the actor or suspicious event may have been a significant factor in the targeted attack. Embodiments of the instant disclosure may also provide various other advantages and features, as discussed in greater detail below.

Figure 2:
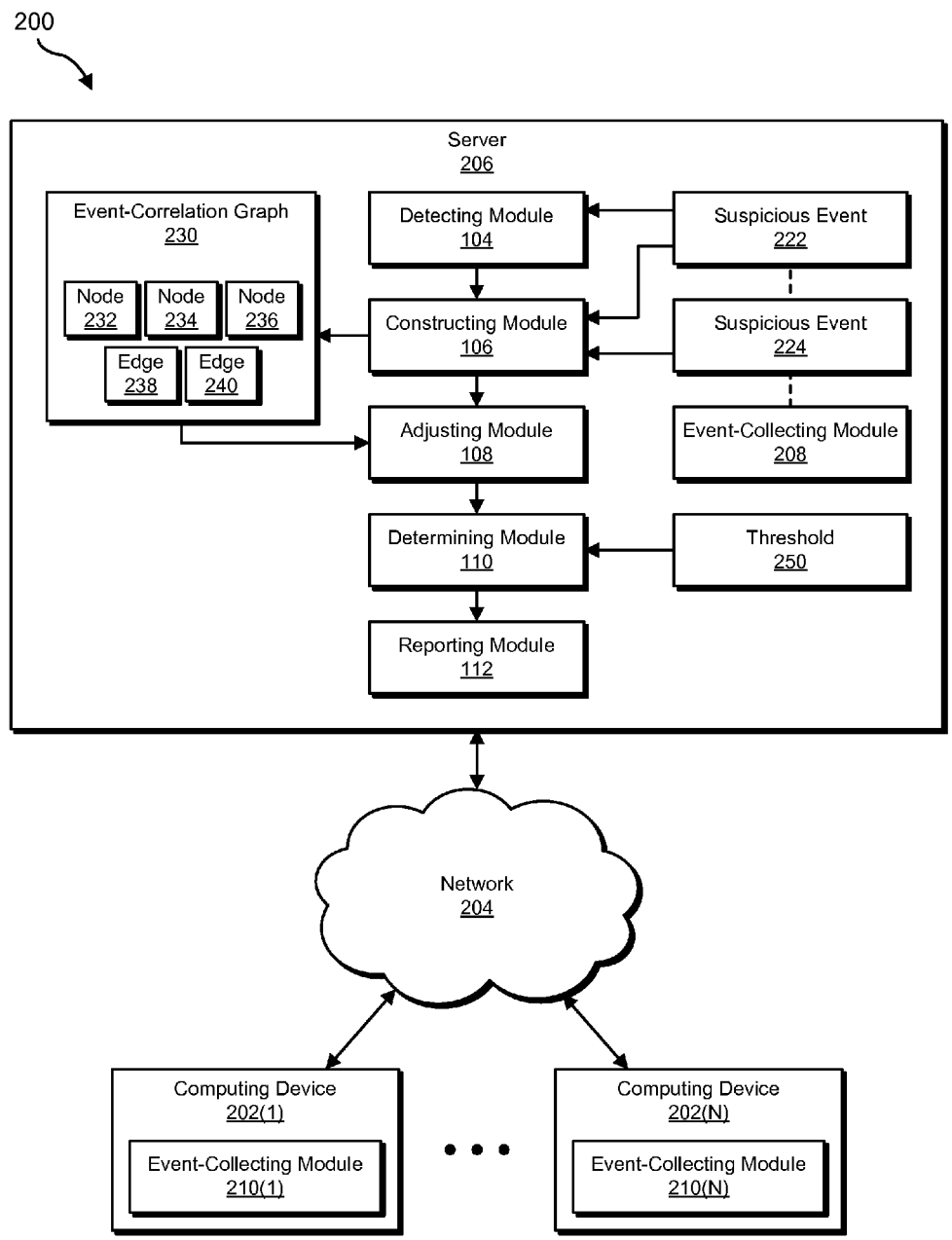
FIG. 2 is a block diagram of an additional exemplary system for adjusting suspiciousness scores in event-correlation graphs.

The following will provide, with reference to FIGS. 1-2, detailed descriptions of exemplary systems for adjusting suspiciousness scores in event-correlation graphs. Detailed descriptions of corresponding computer-implemented methods will also be provided in connection with FIGS. 3-13. In addition, detailed descriptions of an exemplary computing system and network architecture capable of implementing one or more of the embodiments described herein will be provided in connection with FIGS. 14 and 15, respectively.

FIG. 1 is a block diagram of an exemplary system 100 for adjusting suspiciousness scores in event-correlation graphs. As illustrated in this figure, exemplary system 100 may include one or more modules 102 for performing one or more tasks. For example, and as will be explained in greater detail below, exemplary system 100 may include a detecting module 104 that detects a suspicious event involving a first actor and a second actor within a computing system. Exemplary system 100 may also include a constructing module 106 that constructs an event-correlation graph in response to detecting the suspicious event involving the first actor and the second actor.

In addition, and as will be described in greater detail below, exemplary system 100 may include an adjusting module 108 that adjusts a suspiciousness score associated with at least one representation in the event-correlation graph based at least in part on a suspiciousness score associated with at least one other representation in the event-correlation graph such that the adjusted suspiciousness score associated with the at least one representation is influenced by the suspicious event. Exemplary system 100 may also include a determining module 110 that (1) calculates an attack score for the event-correlation graph based at least in part on the adjusted suspiciousness score associated with the at least one representation, (2) determines that the attack score is greater than a predetermined threshold, and (3) determines that the suspicious event may be part of an attack on the computing system based at least in part on the attack score being greater than the predetermined threshold. Exemplary system 100 may further include a reporting module 112 that reports the attack on the computing system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing devices 202(1)-(N) and/or server 206), computing system 1410 in FIG. 14, and/or portions of exemplary network architecture 1500 in FIG. 15. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more suspicious events (e.g., suspicious events 122), information about suspiciousness scores associated with actors and/or suspicious events (e.g., suspiciousness scores 124), and/or information about one or more correlation graphs (e.g., event-correlation graphs 126).

Database 120 may represent portions of a single database or computing device or a plurality of databases or computing devices. For example, database 120 may represent a portion of server 206 and/or a portion of computing devices 202(1)-(N) in FIG. 2, computing system 1410 in FIG. 14, and/or portions of exemplary network architecture 1500 in FIG. 15. Alternatively, database 120 in FIG. 1 may represent one or more physically separate devices capable of being accessed by a computing device, such as server 206 in FIG. 2, computing system 1410 in FIG. 14, and/or portions of exemplary network architecture 1500 in FIG. 15.

Exemplary system 100 in FIG. 1 may be implemented in a variety of ways. For example, all or a portion of exemplary system 100 may represent portions of exemplary system 200 in FIG. 2. As shown in FIG. 2, system 200 may include computing devices 202(1)-(N) in communication with a server 206 via a network 204. Computing devices 202(1)-(N) may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing devices 202(1)-(N) and/or server 206, enable computing devices 202(1)-(N) and/or server 206 to adjust the suspiciousness scores of the actors and/or suspicious events represented in event-correlation graphs. For example, and as will be described in greater detail below, one or more of modules 102 may cause computing devices 202(1)-(N) and/or server 206 to adjust the suspiciousness scores of the actors and/or suspicious events represented in event-correlation graphs when using event-correlation graphs to detect attacks on computing systems. For example, and as will be described in greater detail below, detecting module 104 may be programmed to detect a suspicious event 222 involving a first actor and a second actor within a computing system (e.g., computing device 202(1)). Constructing module 106 may be programmed to construct, in response to detecting suspicious event 222 involving the first actor and the second actor, an event-correlation graph 230 that may include at least a node 232 that represents the first actor, a node 234 that represents suspicious event 222, a node 236 that represents the second actor, an edge 238 that interconnects node 232 and node 234, and an edge 240 that interconnects node 234 and node 236. Adjusting module 108 may be programmed to adjust the suspiciousness score associated with at least one node in the event-correlation graph 230 based on the suspiciousness scores associated with other nodes in event-correlation graph 230 such that the suspiciousness score associated with the node is influenced by suspicious event 222.

Computing devices 202(1)-(N) generally represent any type or form of computing device capable of reading computer-executable instructions. Examples of computing devices 202(1)-(N) include, without limitation, laptops, tablets, desktops, servers, cellular phones, Personal Digital Assistants (PDAs), multimedia players, embedded systems, combinations of one or more of the same, exemplary computing system 1410 in FIG. 14, or any other suitable computing device. As illustrated in FIG. 2, one or more of event-collecting modules 210(1)-(N) may detect, log, and/or transmit information about suspicious events (e.g., to server 206).

Server 206 generally represents any type or form of computing device that is capable of reading computer-executable instructions. Examples of server 206 include, without limitation, application servers and database servers configured to provide various database services and/or run certain software applications. As illustrated in FIG. 2, server 206 may include an event-collecting module 208 that collects event information from computing devices 202(1)-(N) and stores this information to database 120. In at least one example, event-collecting module 208 may represent a portion of a security information and event management system (SIEM), a security information management system (SIM), and/or security event manager (SEM).

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 1500 in FIG. 15, or the like. Network 204 may facilitate communication or data transfer using wireless or wired connections. In one embodiment, network 204 may facilitate communication between computing devices 202(1)-(N) and server 206.

Figure 3:
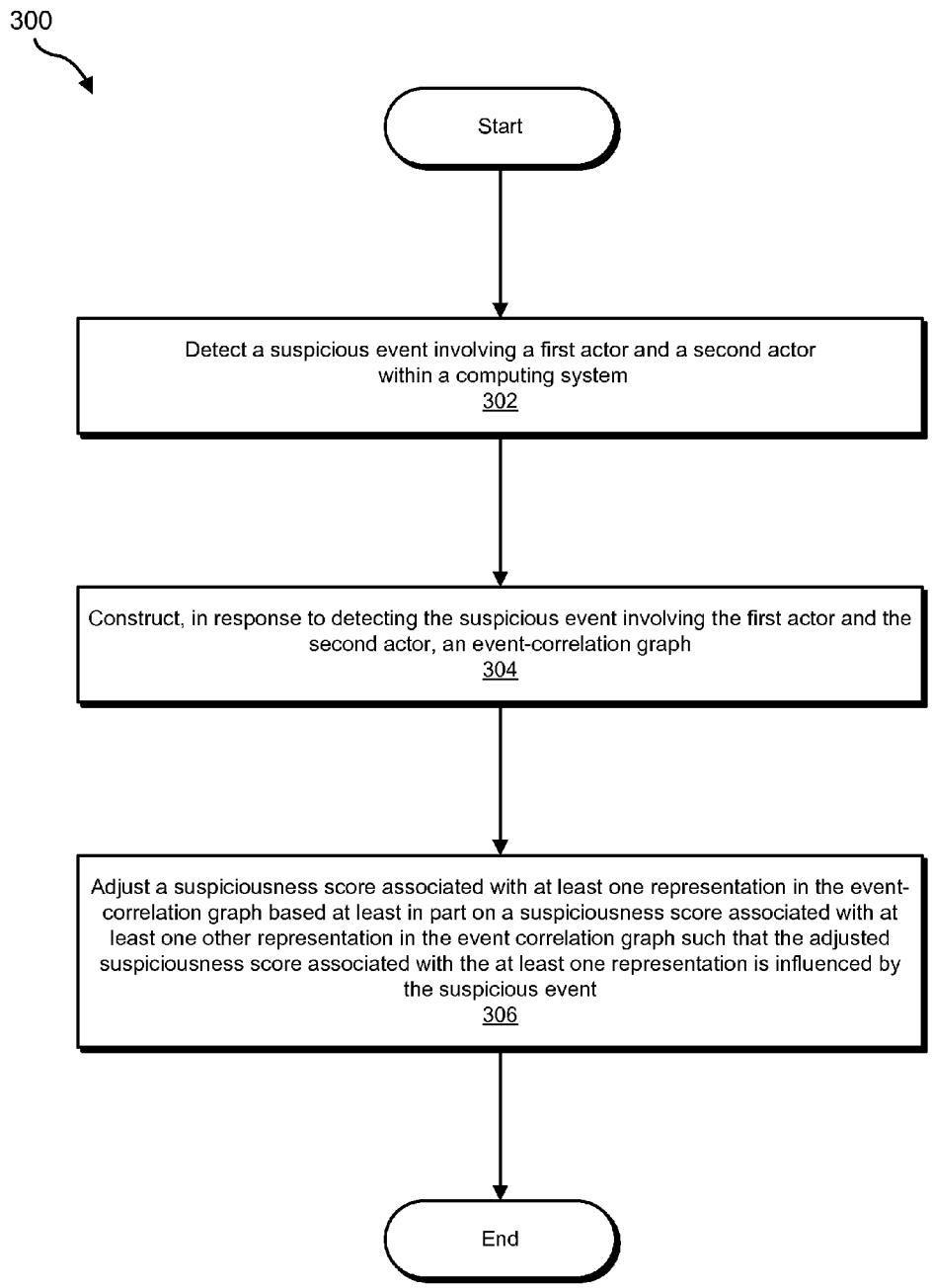
FIG. 3 is a flow diagram of an exemplary method for adjusting suspiciousness scores in event-correlation graphs.

FIG. 3 is a flow diagram of an exemplary computer-implemented method 300 for adjusting suspiciousness scores in event-correlation graphs. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 3, at step 302 one or more of the systems described herein may detect a suspicious event involving a first actor and a second actor within a computing system. For example, detecting module 104 may, as part of server 206 in FIG. 2, detect suspicious event 222 involving a first actor (e.g., a process executing on computing system 201(1)) and a second actor (e.g., another process executing on computing system 201(1)).

The phrase "suspicious event," as used herein, generally refers to any occurrence of one or more actions within a computing system that may be indicative of an attack on a computing system. In at least one example, the phrase "suspicious event" may refer to a suspicious high-level event that represents the detection of one or more low-level events. In some examples, the phrase "suspicious event" may represent the occurrence of an action within a computing system that may not reliably indicate an attack on a computing system unless it is correlated with a certain number of additional suspicious events. Examples of suspicious events may include, without limitation, process injections, file creations, file downloads, and/or process creations. Additional examples of suspicious events may include, without limitation, any actions managed and/or monitored by firewalls, routers, switches, virtual private networks, antivirus systems, intrusion detection and intrusion prevention systems, vulnerability scanners, web servers, web filters, proxies, databases, email and/or groupware systems, authentication servers, and/or system loggers. Additionally or alternatively, a suspicious event may represent events detected and/or managed by a Security Information and Event Management system (SIEM), a Security Information Management system (SIM), and/or a Security Event Manager (SEM).

In some examples, a suspicious event may include a process injection. As used herein, the phrase "process injection" may refer to any method for one process to introduce executable instructions into another process to execute. Examples of process injection may include injecting a dynamic-link library into a running process and hooking a function call within another process.

As used herein, the term "actor" may refer to any computing entity that may perform an action and/or any computing entity that may have an action performed on it. Examples of actors may include, without limitation, user accounts, processes, applications, computing devices, files, ports, information resources (e.g., a website), and/or any network-addressable entities.

Detecting module 104 may detect a suspicious event that involves an actor in any of a variety of ways. For example, detecting module 104 may detect a suspicious event that involves an actor by monitoring the actor and by detecting when the actor performs a suspicious action. For example, detecting module 104 may represent an agent of a SIEM or SIM system running on a computing device that detects and/or collects information about suspicious events that occur on the computing device and may detect the suspicious event as part of the agent of the SIEM or SIM system.

In another example, detecting module 104 may detect a suspicious event that involves an actor by receiving information about the suspicious event. Using FIG. 2 as an example, detecting module 104 may receive information about a suspicious event that involved an actor from one or more of event-collecting modules that detected and logged the suspicious event. Additionally or alternatively, detecting module 104 may detect a suspicious event by identifying a previously detected suspicious event. For example, detecting module 104 may represent a server-side or cloud-based system that analyzes information about previously detected suspicious events.

In some examples, detecting module 104 may detect a suspicious event that involves an actor by detecting when the actor performs the suspicious event. For example, detecting module 104 may, as a part of a computing system, detect a suspicious event that involves an actor on the computing system by detecting when the actor performs the suspicious event. In addition to detecting suspicious events, detecting module 104 may also identify information about the event, such as, for example, information that identifies the actor or actors involved with the suspicious event and/or information that identifies attributes of the suspicious event and/or actors.

Figure 4:
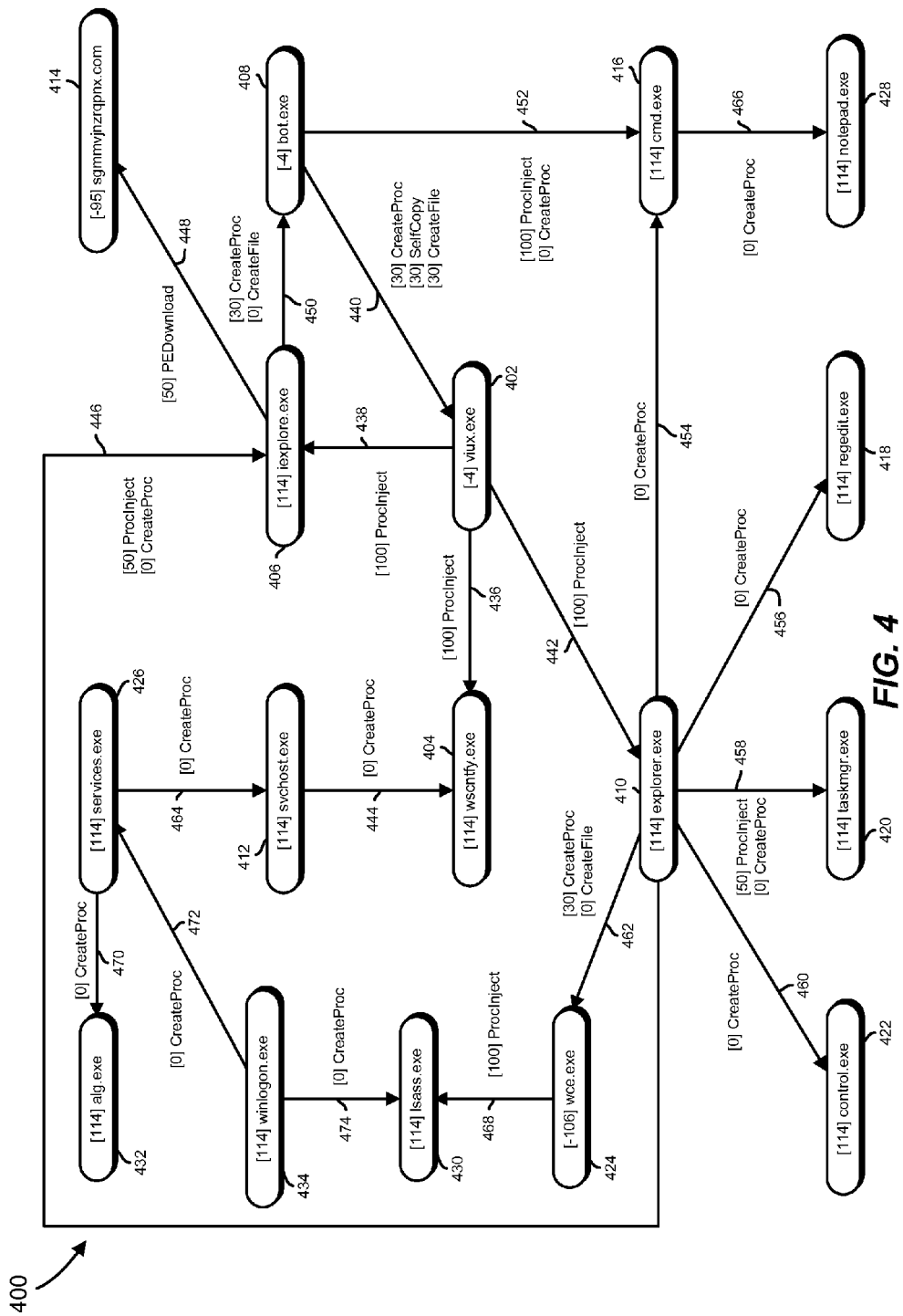
FIG. 4 is a block diagram of an exemplary event-correlation graph.

To provide an example of detecting module 104 detecting a suspicious event, FIG. 4 illustrates an exemplary event-correlation graph 400. As shown in FIG. 4, event-correlation graph 400 may represent an actor 402 (e.g., the process "viux.exe"), an actor 404 (e.g., the process "wscntfy.exe"), and an event 436 (e.g., a process injection between actor 402 and actor 404). Using FIG. 4 as an example, detecting module 104 may detect event 436 involving actors 402 and 404.

In at least one example, detecting module 104 may detect a suspicious event that involves two actors by (1) detecting a suspicious event that involves a single actor and (2) identifying a suspicious event that involves the same actor and an additional actor. In this example, detecting module 104 may consider the event that involved two actors suspicious based at least in part on the suspicious event that involved only one actor.

Returning to FIG. 3, at step 304 one or more of the systems described herein may construct, in response to detecting the suspicious event involving the first actor and the second actor, an event-correlation graph that may include (i) a representation of the first actor, (ii) a representation of the suspicious event that may be interconnected with the representation of the first actor, and (iii) a representation of the second actor that may be interconnected with the representation of the suspicious event. For example, constructing module 106 may, as part of server 206 in FIG. 2, construct, in response to detecting suspicious event 222, event-correlation graph 230 that includes node 232 that represents the first actor, node 234 that represents suspicious event 222, node 236 that represents the second actor, edge 238 that interconnects node 232 and node 234, and edge 240 that interconnects node 234 and node 236.

As used herein, the term "event-correlation graph" generally refers to any logical, topological, and/or graphical representation of one or more correlated events that may be based on how the actors involved in the events and/or events are related by the events. As such, an event-correlation graph may represent a context in which an actor is involved in a suspicious event and/or a context in which a suspicious event occurs. In some examples, an event-correlation graph may represent an attack on a computing system in which the actors and suspicious events represented in the event-correlation graph may have played significant factors. Examples of event-correlation graphs may include event-correlation graph 400 in FIG. 4, event-correlation graph 500 in FIG. 5, event-correlation graph 600 in FIG. 6, event-correlation graph 700 in FIG. 7, event-correlation graph 800 in FIG. 8, event-correlation graph 900 in FIG. 9, event-correlation graph 1000 in FIG. 10, event-correlation graph 1100 in FIG. 11, and event-correlation graph 1300 in FIG. 13.

As will be described in greater detail below, event-correlation graphs may be built from information about one or more suspicious events and may include representations of the actors involved in the suspicious events and representations of the suspicious events that are interconnected based on how the actors and/or suspicious events are related by the suspicious events. In some examples, the systems and methods described herein may use nodes to represent actors and edges (e.g., directed edges) to represent the suspicious events within which the actors are involved. Using FIG. 4 as an example, event-correlation graph 400 may include nodes 402-434 interconnected by directed edges 436-474. In this example, nodes 402-434 may represent the actors involved with the correlated suspicious events represented by directed edges 436-474.

Additionally or alternatively, the systems and methods described herein may use nodes to represent actors and suspicious events and edges to represent how the actors and suspicious events are interconnected. Using FIG. 5 as an example, event-correlation graph 500 may include nodes 402-434 and nodes 502-556 interconnected by directed edges (e.g., directed edges 558 and 560). In this example, nodes 402-434 may represent the actors involved with the correlated suspicious events represented by nodes 502-556. As will be explained in greater detail below, one or more of the systems described herein may create event-correlation graph 400 and/or event-correlation graph 500 in response to detecting the suspicious event represented by edge 436 involving the processes "viux.exe" and "wscntfy.exe" represented by nodes 402 and 404, respectively.

Event-correlation graphs may include any of a variety of events. In some examples, detecting module 104 and/or constructing module 106 may identify and include within an event-correlation graph events that have been determined to be independently suspicious. Additionally or alternatively, detecting module 104 and/or constructing module 106 may identify and include within an event-correlation graph events that may be suspicious in context of other suspicious events.

Constructing module 106 may construct an event-correlation graph in any suitable manner. For example, constructing module 106 may construct the event-correlation graph in response to detecting a suspicious event by identifying additional suspicious events that may be correlated with the suspicious event based on how the actors involved in the suspicious event and the additional suspicious events are related by the suspicious event and the additional suspicious events.

In one example, constructing module 106 may construct an event-correlation graph in response to detecting a suspicious event by adding one or more nodes and edges based on a single suspicious event, after which constructing module 106 may iteratively add nodes and edges to the event-correlation graph starting with the suspicious event and any actors involved in the suspicious event. For example, in response to detecting a suspicious event involving a first actor, constructing module 106 may construct an event-correlation graph for the suspicious event by first generating an event-correlation graph that includes at least a node that represents the first actor. In the event that the suspicious event involves a second actor, constructing module 106 may add an additional node to the event-correlation graph that represents the second actor and an edge that connects the nodes representing the first and second actors.

In some examples, constructing module 106 may construct an event-correlation graph using only suspicious events. For example, upon adding at least one node to the event-correlation graph, constructing module 106 may identify, for each actor represented by a node within the event-correlation graph, a set of suspicious events that involve the actor and at least one additional actor. Constructing module 106 may further add, for each suspicious event within the set of suspicious events, an additional node to the event-correlation graph that represents the additional actor and an additional edge to the event-correlation graph that interconnects the node and the additional node and represents the event involving the actor and the additional actor.

FIGS. 6-10 illustrate how constructing module 106 may iteratively construct event-correlation graph 400 in FIG. 4.

Figure 6:
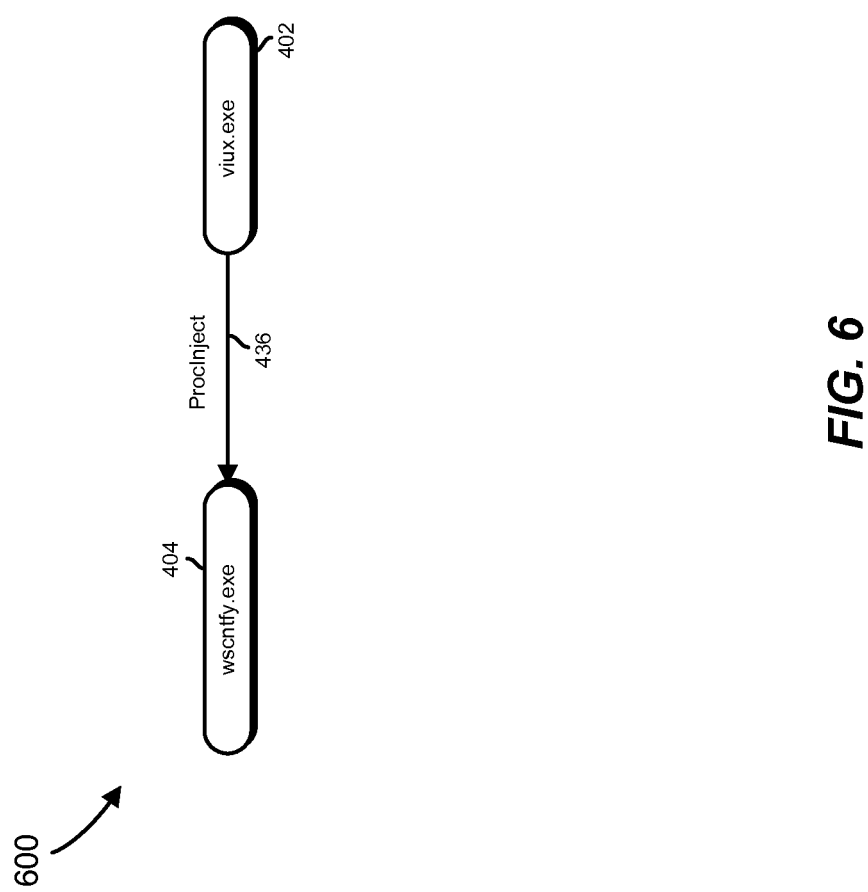
FIG. 6 is a block diagram of an exemplary event-correlation graph.

FIG. 6 is a block diagram of an exemplary event-correlation graph 600. As shown in FIG. 6, event-correlation-graph 600 may represent a first iteration in the construction of event-correlation graph 400 in FIG. 4. In this example, detecting module 104 may have detected a suspicious process-injection event involving the processes "viux.exe" and "wscntfy.exe." In response to this detection, constructing module 106 may have generated event-correlation-graph 600 that includes node 402 that represents the process "viux.exe" and node 404 that represents the process "wscntfy.exe" connected by an edge 436 that represents the suspicious process-injection event.

Figure 7:
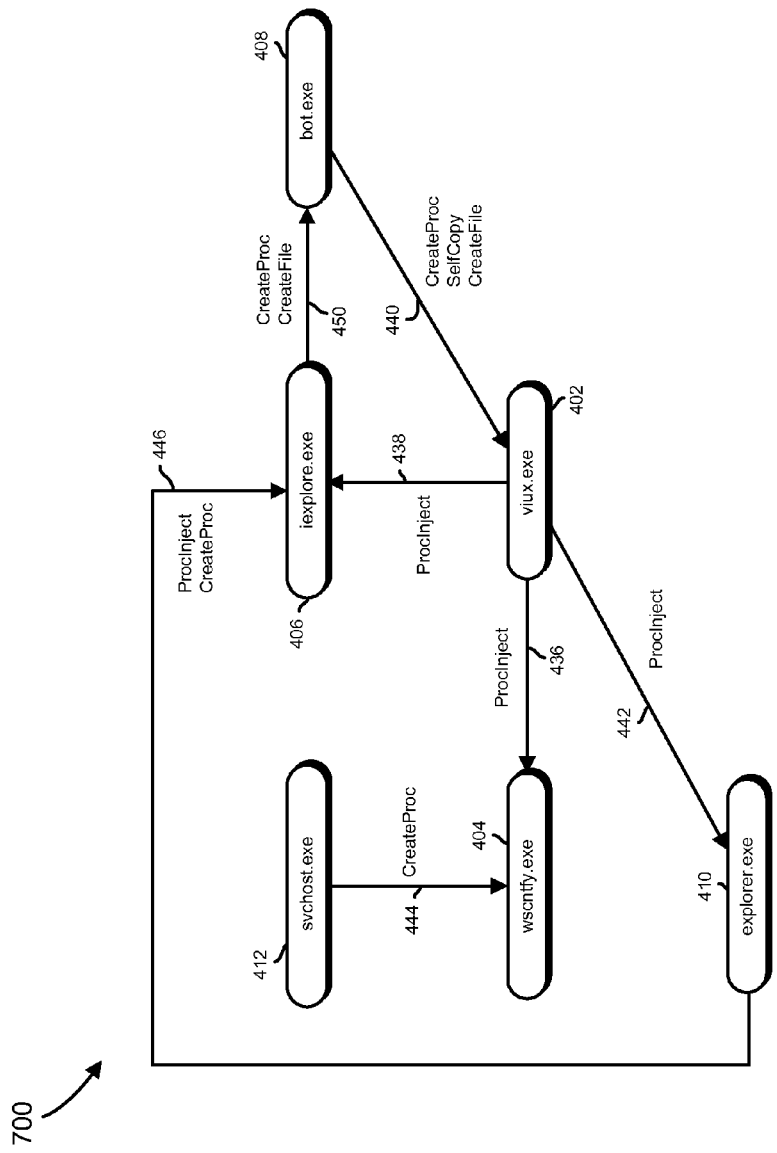
FIG. 7 is a block diagram of an exemplary event-correlation graph.
Figure 8:
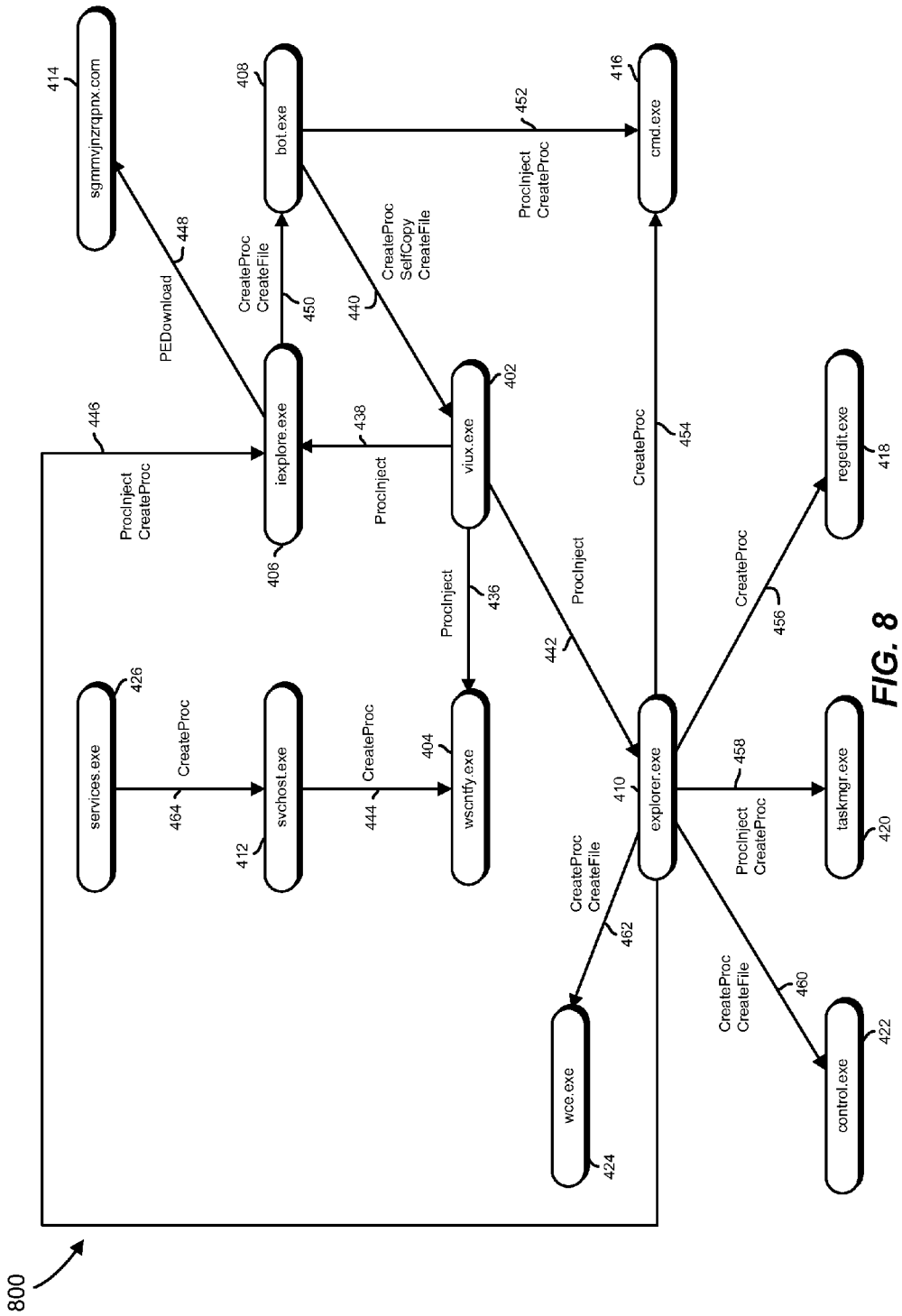
FIG. 8 is a block diagram of an exemplary event-correlation graph.
Figure 9:
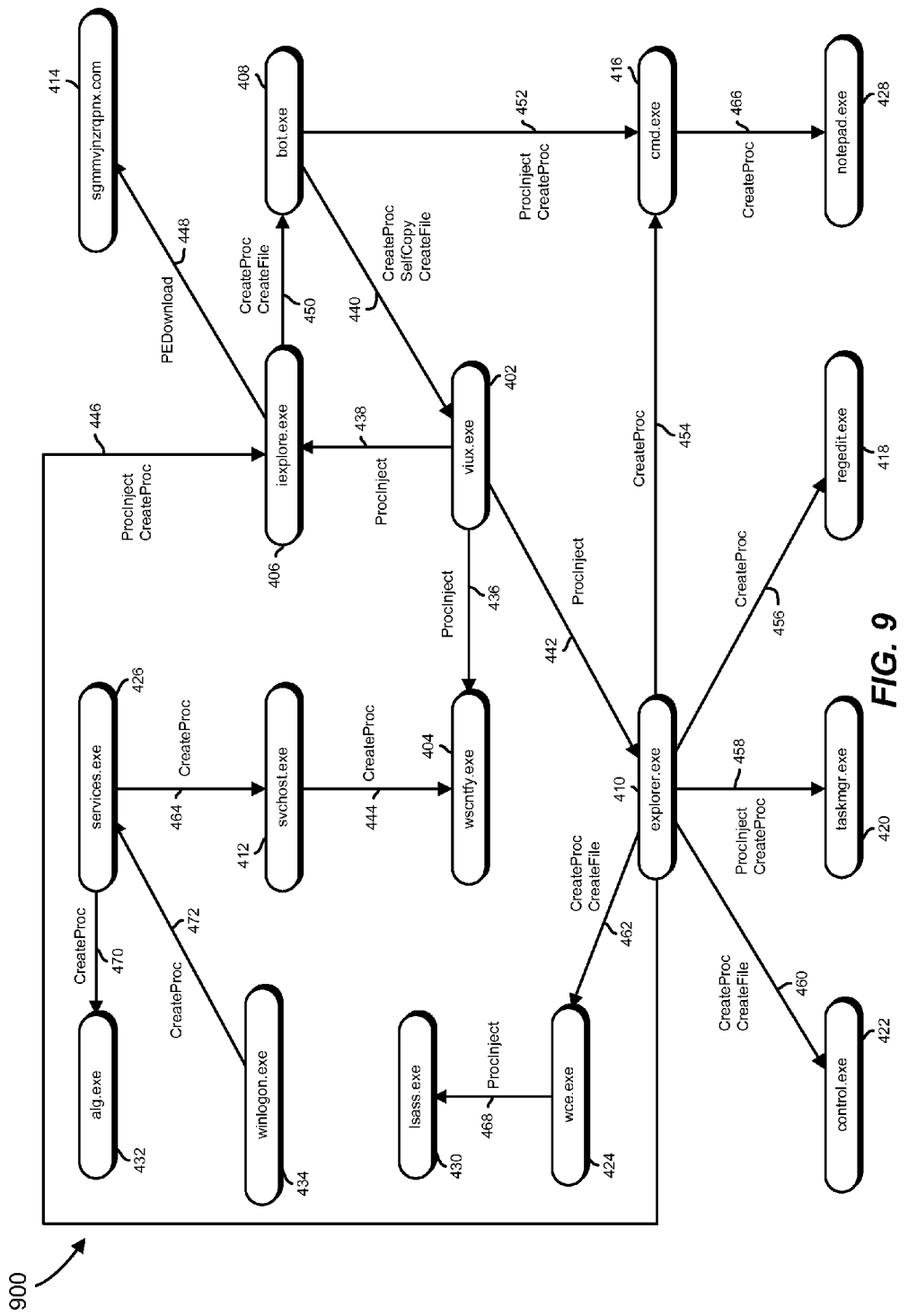
FIG. 9 is a block diagram of an exemplary event-correlation graph.
Figure 10:
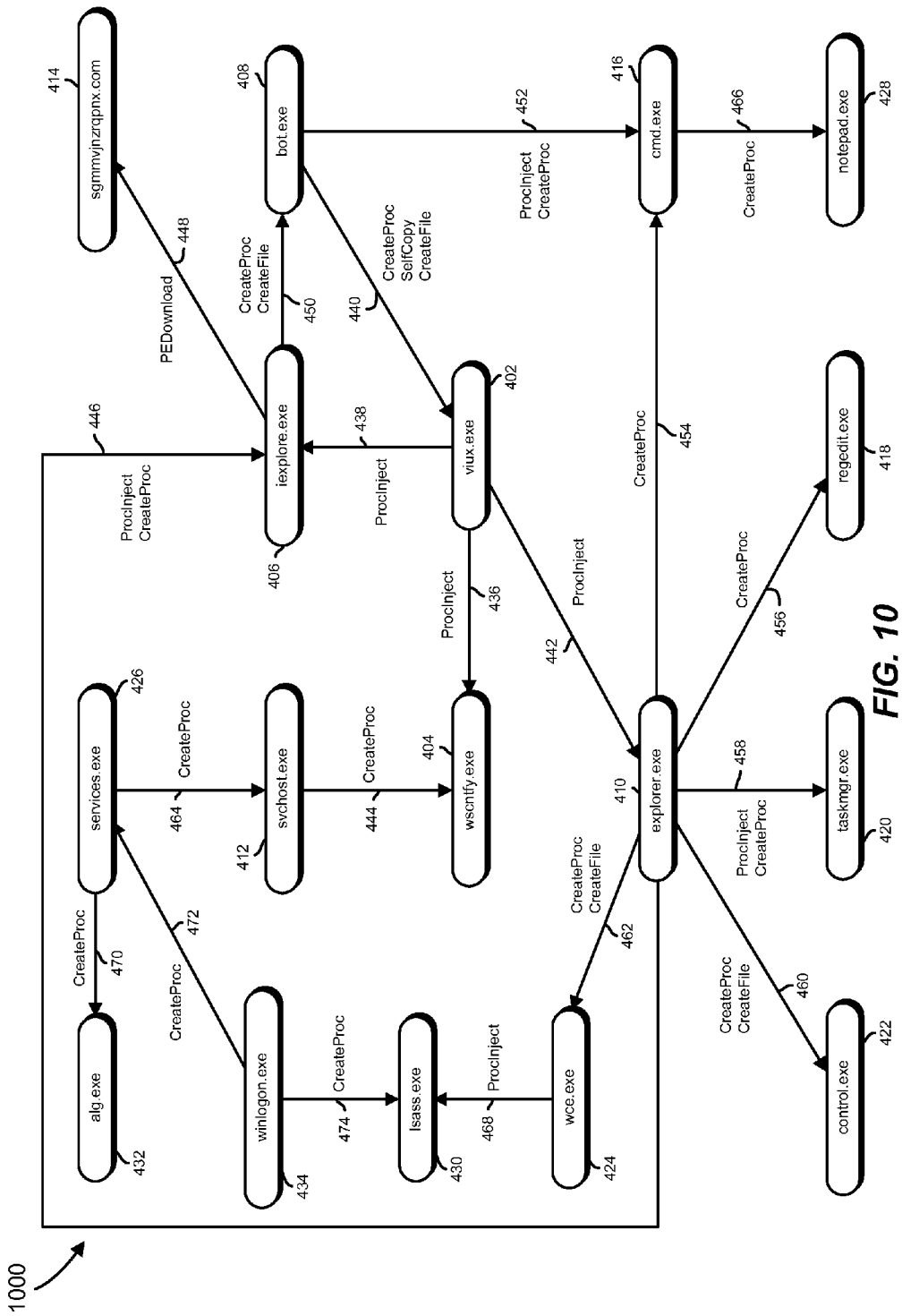
FIG. 10 is a block diagram of an exemplary event-correlation graph.

Upon constructing event-correlation graph 600 in FIG. 6, constructing module 106 may construct event-correlation graph 700 in FIG. 7 from event-correlation graph 600 by (1) identifying additional suspicious events that involve the actors represented in event-correlation graph 600 (e.g., process "viux.exe" and process "wscntfy.exe") and (2) adding, for each identified suspicious event, a representation of the suspicious event to event-correlation graph 700. For example, constructing module 106 may identify, for process "viux.exe" represented by node 402 in event-correlation graph 600, a set of suspicious events that involve process "viux.exe" and one of processes "iexplorer.exe," "bot.exe," and "explorer.exe." Constructing module 106 may add nodes to event-correlation graph 600 that represent these additional actors (e.g., nodes 406, 408, and 410) and edges that represent the set of suspicious events (e.g., edges 438, 440, and 442) and that interconnect node 402 and nodes 406, 408, and 410. Constructing module 106 may also identify, for process "wscntfy.exe" represented by node 404 in event-correlation graph 600, a suspicious event that involves process "wscntfy.exe" and process "svchost.exe." In response, constructing module 106 may add a node to event-correlation graph 600 that represents process "svchost.exe" (e.g., node 412) and an edge that represents the suspicious event involving process "wscntfy.exe" and process "svchost.exe" (e.g., edge 444) and that interconnects node 404 and node 412.

Upon constructing event-correlation graph 700 in FIG. 7, constructing module 106 may construct exemplary event-correlation graph 800 from event-correlation graph 700 by (1) identifying additional suspicious events that involve the new actors represented in event-correlation graph 700 (e.g., process "iexplore.exe," process "bot.exe," process "explorer.exe," and process "svchost.exe") and (2) adding, for each identified suspicious event, a representation of the suspicious event to event-correlation graph 700 in FIG. 7.

Constructing module 106 may continue to iteratively construct event-correlation graph 400 from event-correlation graph 800 until constructing module 106 is unable to identify additional suspicious events. For example, constructing module 106 may construct event-correlation graph 900 in FIG. 9 from event-correlation graph 800 in FIG. 8 and event-correlation graph 1000 in FIG. 10 from event-correlation graph 900. Constructing module 106 may determine that event-correlation graph 1000 represents a completed event-correlation graph after identifying no additional suspicious events involving the actors in event-correlation graph 1000.

As will be explained in greater detail below, the systems and methods described herein may use suspiciousness scores associated with the actors and/or suspicious events represented in an event-correlation graph to detect attacks involving the actors and/or suspicious events. For at least this reason, constructing module 106 may determine the suspiciousness scores of the actors or suspicious events represented in an event-correlation graph as part of constructing the event-correlation graph. Using FIG. 4 as an example, constructing module 106 may determine the suspiciousness scores associated with the actors and suspicious events represented in event-correlation graph 400 (e.g., the bracketed number next to each actor and suspicious event in event-correlation graph 400) as part of constructing event-correlation graph 400. Although not illustrated in FIG. 5, nodes 402-434 and nodes 502-556 may be associated with the suspiciousness scores of the actors and/or suspicious events that they represent.

In some examples, constructing module 106 may construct an event-correlation graph based on the method used by adjusting module 108 to adjust suspiciousness scores in the event-correlation graph. For example, constructing module 106 may construct an event-correlation graph in which actors and suspicious events are represented using nodes, assuming adjusting module 108 implements a method that uses such event-correlation graphs.

In some examples, constructing module 106 may transform an event-correlation graph from one form to another based on the needs of adjusting module 108. Using FIGS. 4 and 5 as an example, constructing module 106 may transform event-correlation graph 400 in FIG. 4 into event-correlation graph 500 in FIG. 5.

Returning to FIG. 3, at step 306 one or more of the systems described herein may adjust a suspiciousness score associated with at least one representation in the event-correlation graph based at least in part on a suspiciousness score associated with at least one other representation in the event-correlation graph such that the adjusted suspiciousness score associated with the at least one representation is influenced by the suspicious event. For example, adjusting module 108 may, as part of server 206 in FIG. 2, adjust a suspiciousness score associated with node 232 in event-correlation graph 230 based at least in part on the suspiciousness scores associated with nodes 234 and 236 such that the suspiciousness score associated with node 232 may be influenced by suspicious event 222.

As used herein, the term "suspiciousness score" may generally refer to any metric or information that indicates the maliciousness, suspiciousness, trustworthiness, prevalence, prominence, community opinion, and/or reputation of an actor or event. In some examples, the term "suspiciousness score" may refer to a metric or information that indicates whether an actor or event represents a part of an attack and/or whether the actor or event represents a potential security risk. In the example provided in FIG. 4, the suspiciousness scores associated with actors may be on a scale from −120 to +120, where a score near −120 may indicate a high likelihood of being malicious and a score near +120 may indicate a low likelihood of being malicious. Similarly, in the example provided in FIG. 4, the suspiciousness scores associated with events may be on a scale from 0 to 250, where a score near 250 may indicate a high likelihood of being malicious and a score near 0 may indicate a low likelihood of being malicious.

Adjusting module 108 may adjust the suspiciousness scores of actors and/or suspicious events represented in an event-correlation graph in any suitable manner. In one example, adjusting module 108 may adjust the suspiciousness score of an actor or a suspicious event represented in an event-correlation graph based on the suspiciousness scores of the actors and/or suspicious events to which the actor or suspicious event may be connected by the event-correlation graph. In general, adjusting module 108 may adjust the suspiciousness score of an actor or a suspicious event represented in an event-correlation graph such that the suspiciousness score of the actor or suspicious event is influenced by the context represented by the event-correlation graph. For example, if an actor whose suspiciousness score indicates a low likelihood of being malicious is connected by an event-correlation graph to actors and/or suspicious events whose suspiciousness scores indicate a high likelihood of being malicious, adjusting module 108 may adjust the suspiciousness score of the actor such that the actor's adjusted suspiciousness score indicates a higher likelihood of being malicious.

Adjusting module 108 may adjust the suspiciousness scores of actors and/or suspicious events represented in an event-correlation graph using any suitable algorithm and/or heuristic. For example, adjusting module 108 may adjust the suspiciousness scores in an event-correlation graph by applying a belief-propagation algorithm, a heat-diffusion algorithm, a label-propagation algorithm, and/or any suitable information-diffusion algorithm to the event-correlation graph.

In some examples, adjusting module 108 may adjust the suspiciousness score of an actor or a suspicious event represented in an event-correlation graph by iteratively transmitting messages among the nodes and along the edges in the event-correlation graph that may indicate a collective belief that the actor and/or suspicious event is or is not malicious. Adjusting module 108 may iteratively transmit messages until a collective belief that an actor and/or suspicious event is or is not malicious converges and/or after a predetermined number of iterations has been reached. Adjusting module 108 may then adjust the suspiciousness score of the actor or suspicious event based on the collective belief that the actor and/or suspicious event is or is not malicious.

In one example, adjusting module 108 may transmit messages and/or calculate collective beliefs according to the formulas in Table 1. In Table 1, $m_{ij}(x_j)$ may represent a message sent from a node i to a node j that indicates a belief of node i that node j is in state x, $\psi_{ij}(x_i,x_j)$ may represent an edge potential, $\phi_i(x_i)$ may represent a prior probability that node i is in state x, N(i) may represent the in-neighbors of node i, and $m_{ki}(x_i)$ may represent a message that node i receives from a node k that indicates a belief of node k that node i is in state x. In addition, $b_i(x_i)$ may represent a final belief that node i is in state x, k may be a normalization constant, and $m_{ji}(x_i)$ may represent a message that node i receives from node j that indicates a belief of node j that node i is in state x.

TABLE 1

$$m_{ij}(x_j) = \sum_{x_i \in X} \psi_{ij}(x_i, x_j)\phi_i(x_i) \sum_{k \in N(i)/j} m_{ki}(x_i)$$

$$b_i(x_i) = k\phi_i(x_i) \sum_{x_j \in N(i)} m_{ji}(x_i)$$

In some examples, adjusting module 108 may transmit messages and/or calculate collective beliefs using two states (e.g., a "good" state and a "bad" state). In one example, an actor or suspicious event in a "good" state may represent an actor or suspicious event that is malicious, and an actor or suspicious event in a "bad" state may represent an actor or suspicious event that is not malicious. In at least one example, adjusting module 108 may calculate $\phi_i(\text{good})$ and/or $\phi_i(\text{bad})$ for a node in an event-correlation graph based on the suspiciousness score associated with the node. Similarly, adjusting module 108 may adjust the suspiciousness score associated with a node based on $b_i(\text{good})$ and/or $b_i(\text{bad})$ of the node.

In some examples, adjusting module 108 may transmit messages from nodes that represent actors (e.g., rectangular nodes in FIG. 5) to nodes that represent suspicious events (e.g., circular nodes in FIG. 5) according to the formulas in Table 2. In Table 2, $m_{ij}(\text{good})$ may represent a message sent from node i to node j that indicates a belief of node i that node j is in a good state, and $m_{ij}(\text{bad})$ may represent a message sent from node i to node j that indicates a belief of node i that node j is in a bad state. P(event=good|good env.) may represent a probability that an event in a good state exists within a good environment (e.g., a computing environment within which malware may be prevented), P(event=good|bad env.) may represent a probability that an event in a good state exists within a bad environment (e.g., a computing environment within which malware may not be prevented), P(event=bad|good env.) may represent a probability that an event in a bad state exists within a good environment, and P(event=bad|bad env.) may represent a probability that an event in a bad state exists within a bad environment. $\phi_i(\text{good})$ may represent a prior probability that node i is in a good state, and $\phi_i(\text{bad})$ may represent a prior probability that node i is in a bad state. $m_{ki}(\text{good})$ may represent a message that node i receives from node k that indicates a belief of node k that node i is in a good state, and $m_{ki}(\text{bad})$ may represent a message that node i receives from node k that indicates a belief of node k that node i is in a bad state.

TABLE 2

$$m_{ij}(\text{good}) = P(\text{event} = \text{good} | \text{good env.}) \times \phi_i(\text{good}) \times \sum_{k \in N(i)/j} m_{ki}(\text{good}) +$$

$$P(\text{event} = \text{good} | \text{bad env.}) \times \phi_i(\text{bad}) \times \sum_{k \in N(i)/j} m_{ki}(\text{bad})$$

$$m_{ij}(\text{bad}) = P(\text{event} = \text{bad} | \text{good env.}) \times \phi_i(\text{good}) \times \sum_{k \in N(i)/j} m_{ki}(\text{good}) +$$

$$P(\text{event} = \text{bad} | \text{bad env.}) \times \phi_i(\text{bad}) \times \sum_{k \in N(i)/j} m_{ki}(\text{bad})$$

In some examples, adjusting module 108 may transmit messages from nodes that represent suspicious events to nodes that represent actors according to the formulas in Table 3. In Table 3, $m_{ij}(\text{good})$ may represent a message sent from node i to node j that indicates a belief of node i that node j is in a good state, and $m_{ij}(\text{bad})$ may represent a message sent from node i to node j that indicates a belief of node i that node j is in a bad state. P(actor=good|good env.) may represent a probability that an actor in a good state exists within a good environment, P(actor=bad|good env.) may represent a probability that an actor in a bad state exists within a good environment, P(actor=good|bad env.) may represent a probability that an actor in a good state exists within a bad environment, and P(actor=bad|bad env.) may represent a probability that an actor in a bad state exists within a bad environment. $\phi_i(\text{good})$ may represent a prior probability that node i is in a good state, and $\phi_i(\text{bad})$ may represent a prior probability that node i is in a bad state. $m_{ki}(\text{good})$ may represent a message that node i receives from node k that indicates a belief of node k that node i is in a good state, and $m_{ki}(\text{bad})$ may represent a message that node i receives from node k that indicates a belief of node k that node i is in a bad state.

TABLE 3

$$m_{ij}(good) = P(actor = good \mid good\ env.) \times \phi_i(good) \times \sum_{k \in N(i)/j} m_{ki}(good) +$$
$$P(actor = bad \mid good\ env.) \times \phi_i(bad) \times \sum_{k \in N(i)/j} m_{ki}(bad)$$

$$m_{ij}(bad) = P(actor = good \mid bad\ env.) \times \phi_i(good) \times \sum_{k \in N(i)/j} m_{ki}(good) +$$
$$P(actor = bad \mid bad\ env.) \times \phi_i(bad) \times \sum_{k \in N(i)/j} m_{ki}(bad)$$

In some examples, adjusting module 108 may calculate collective beliefs for an actor or suspicious event represented by a node according to the formulas in Table 4. In Table 4, $b_i(good)$ may represent a final belief that node i is in a good state, and $b_i(bad)$ may represent a final belief that node i is in a bad state, k may be a normalization constant. $m_{ji}(good)$ may represent a message that node i receives from node j that indicates a belief of node j that node i is in a good state, $m_{ji}(bad)$ may represent a message that node i receives from node j that indicates a belief of node j that node i is in a bad state.

TABLE 4

$$b_i(good) = k \times \phi_i(good) \times \prod_{j \in N(i)} m_{ji}(good)$$
$$b_i(bad) = k \times \phi_i(bad) \times \prod_{j \in N(i)} m_{ji}(bad)$$

Figure 5:
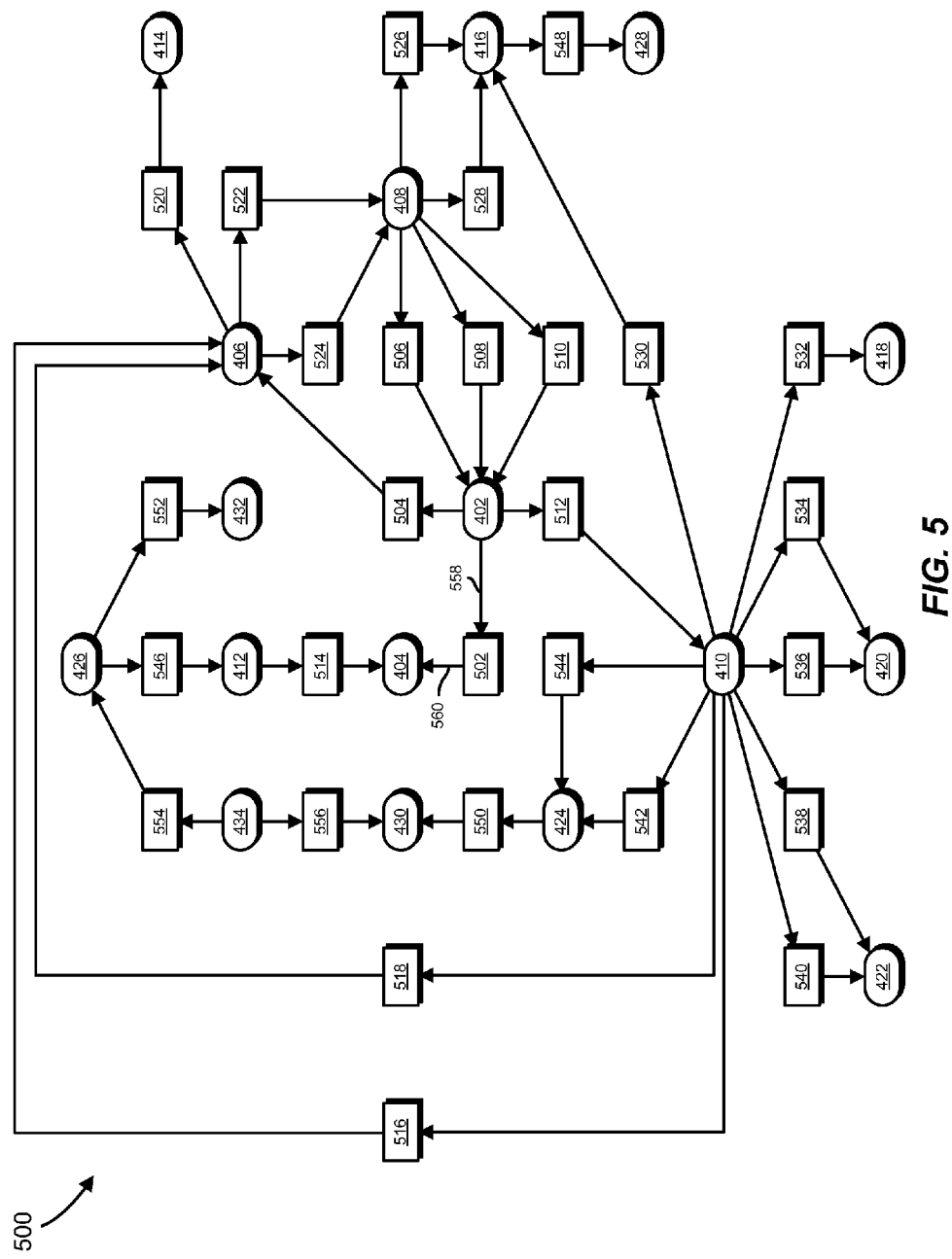
FIG. 5 is a block diagram of an exemplary event-correlation graph.
Figure 11:
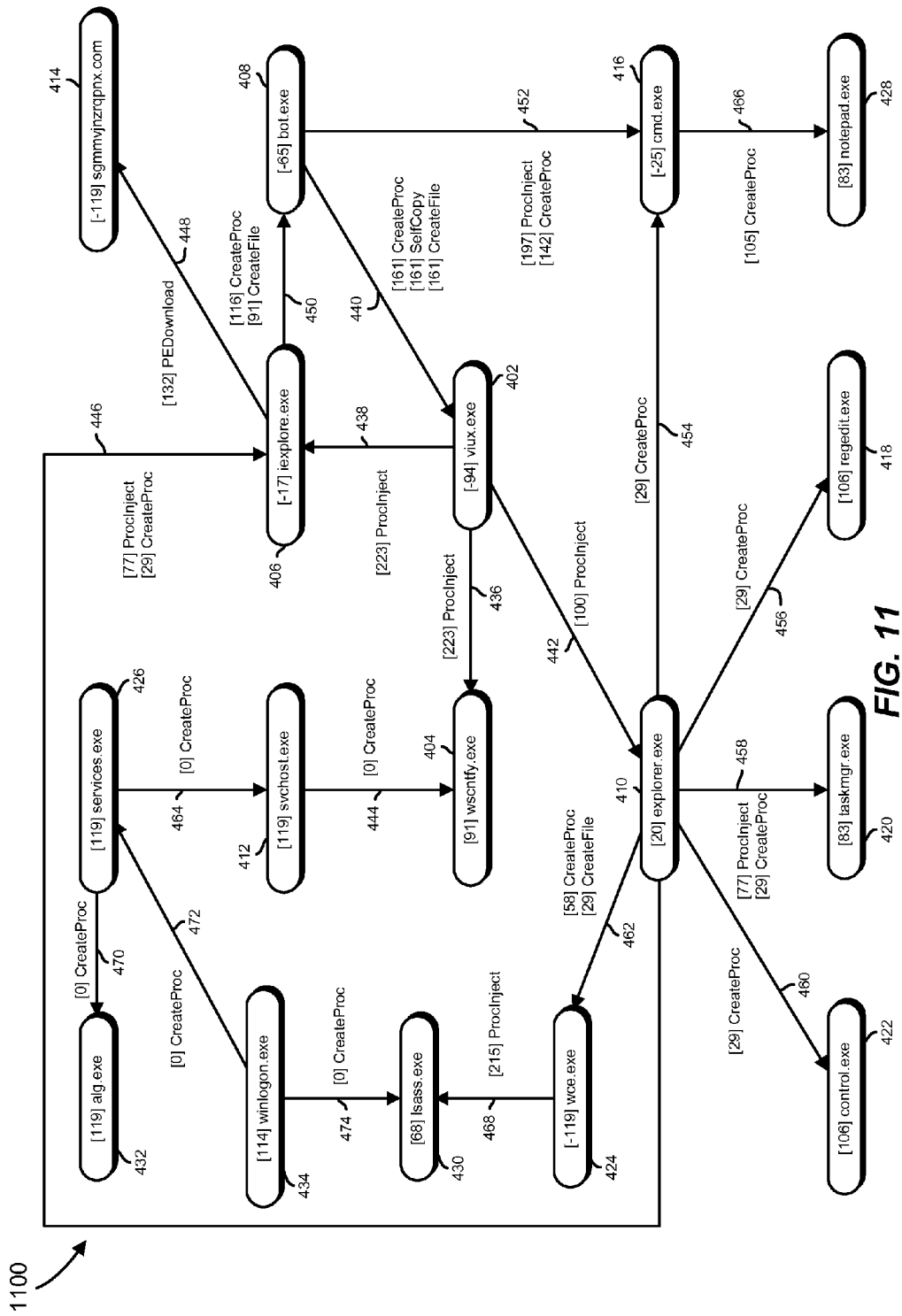
FIG. 11 is a block diagram of an exemplary event-correlation graph.

In at least one example, constructing module 106 may generate exemplary event-correlation graph 1100 in FIG. 11 by adjusting the suspiciousness scores in event-correlation graph 400 in FIG. 4 via event-correlation graph 500 in FIG. 5 and one or more of the methods described above. As such, event-correlation graph 1100 may represent event-correlation graph 400 after adjusting module 108 has adjusted the suspiciousness scores in event-correlation graph 400 based on contextual information represented within event-correlation graph 400. Upon completion of step 306, exemplary method 300 in FIG. 3 may terminate.

Figure 12:
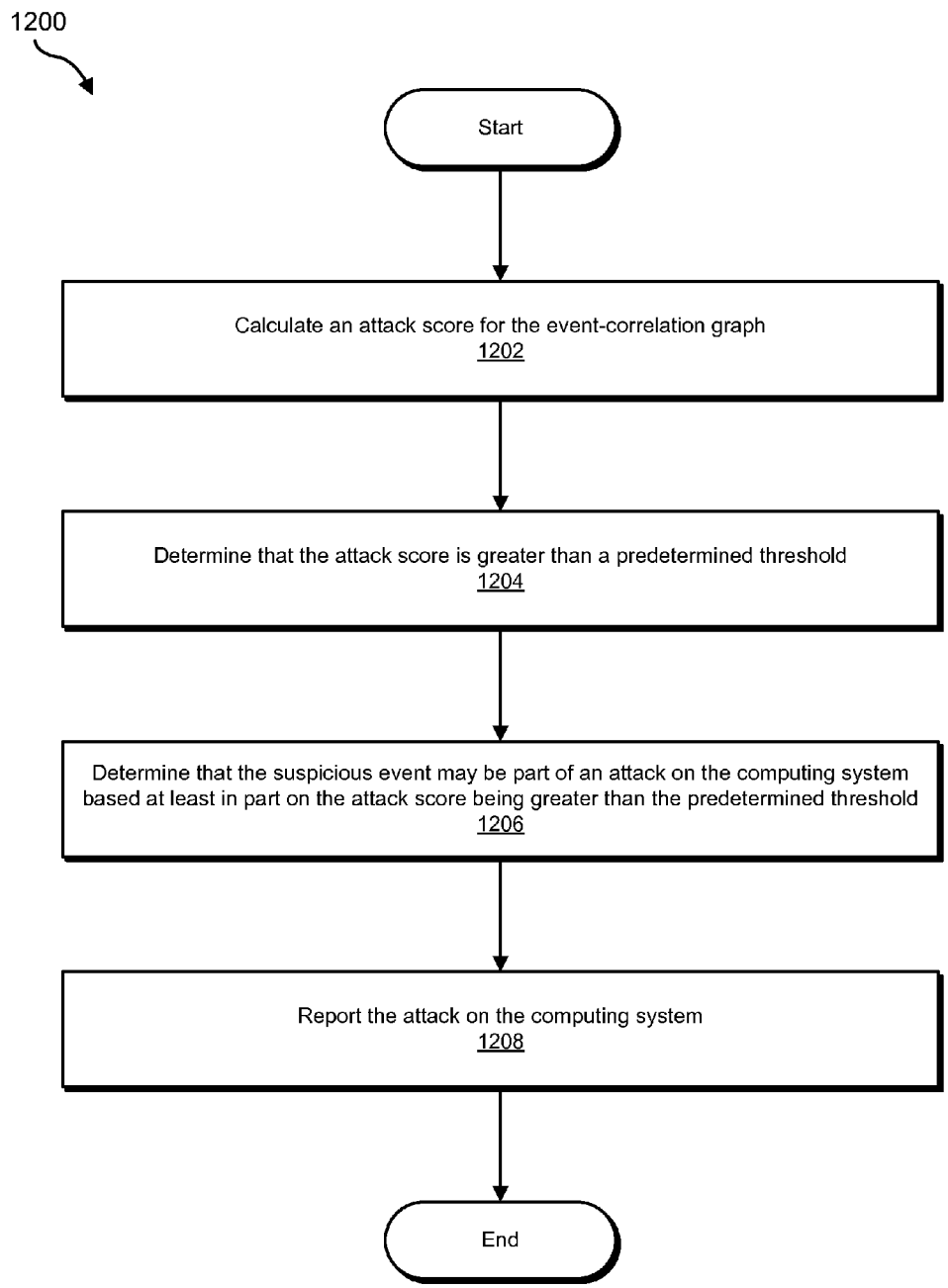
FIG. 12 is a flow diagram of an exemplary method for detecting attacks on computing systems based on adjusted suspiciousness scores.
Figure 13:
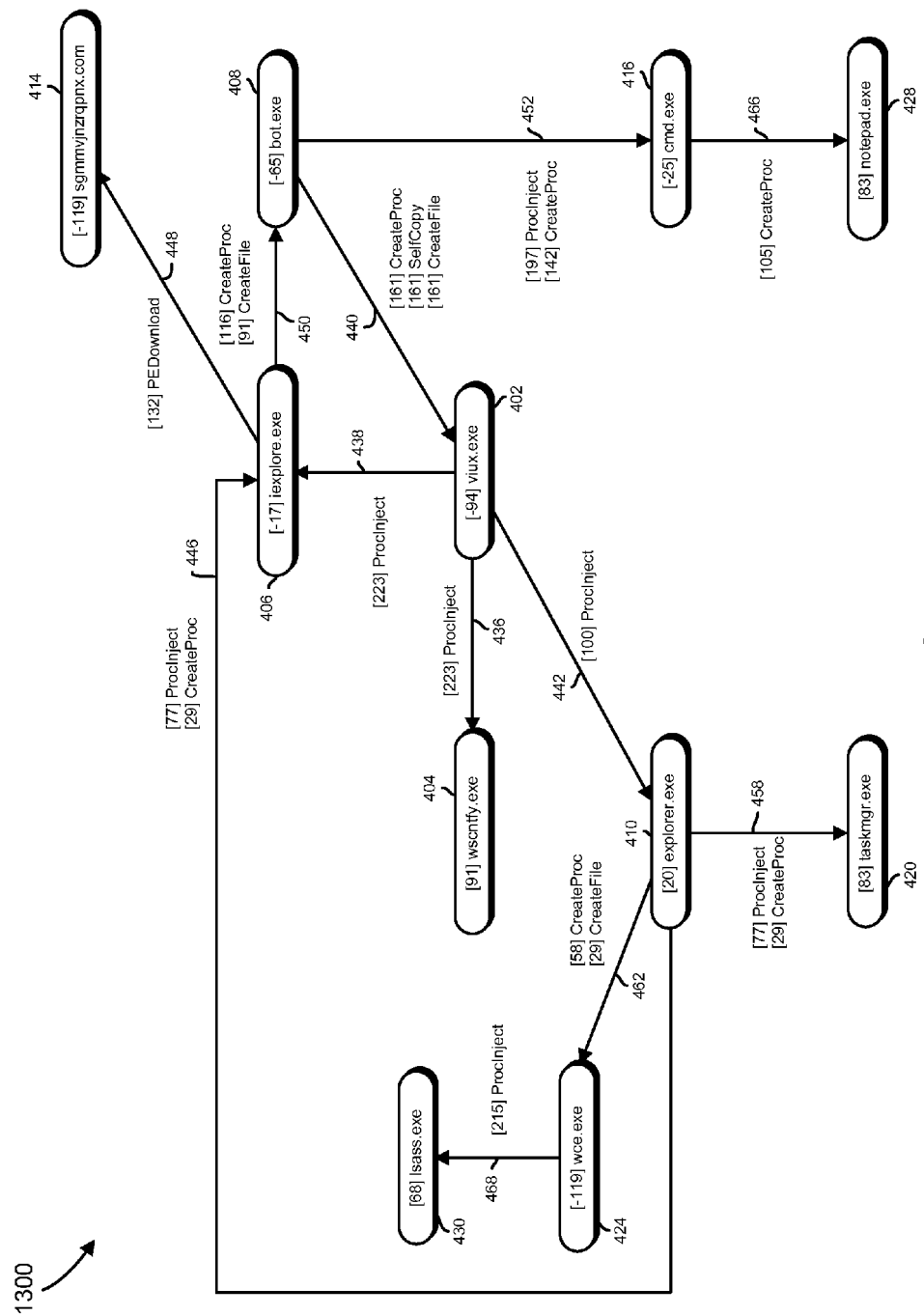
FIG. 13 is a block diagram of an exemplary event-correlation graph.

In some examples, the systems and methods described herein may use adjusted suspiciousness scores to determine that one or more events represented in an event-correlation graph potentially represent an attack on a computing system. FIG. 12 is a flow diagram of an exemplary computer-implemented method 1200 for detecting attacks on computing systems using adjusted suspiciousness scores. The steps shown in FIG. 12 may be performed by any suitable computer-executable code and/or computing system. In some embodiments, the steps shown in FIG. 12 may be performed by one or more of the components of system 100 in FIG. 1, system 200 in FIG. 2, computing system 1410 in FIG. 14, and/or portions of exemplary network architecture 1500 in FIG. 15.

As illustrated in FIG. 12, at step 1202, one or more of the systems described herein may calculate an attack score for an event-correlation graph. For example, determining module 110 may, as part of server 206 in FIG. 2, calculate an attack score for event-correlation graph 230.

Determining module 110 may calculate an attack score for an event-correlation graph in any suitable manner. For example, determining module 110 may calculate an attack score for an event-correlation graph by (1) identifying all or a portion of the actors and/or suspicious events represented within the event-correlation graph, (2) identifying an adjusted suspiciousness score associated with each of the identified actors and/or suspicious events, and (3) using the adjusted suspiciousness scores to calculate an attack score for the event-correlation graph. In one example, determining module 110 may calculate an attack score for an event-correlation graph by simply adding together the suspiciousness scores of each actor and/or suspicious event represented within the event-correlation graph. In some examples, determining module 110 may normalize the adjusted suspiciousness scores of each actor and/or suspicious event prior to calculating the attack score. For example, determining module 110 may calculate an attack score for event-correlation graph 1100 using the adjusted suspiciousness score (e.g., the bracketed number next to each actor and/or suspicious event in event-correlation graph 1100) of each actor and/or suspicious event represented in event-correlation graph 1100.

Returning to FIG. 12, in addition to or as an alternative to calculating attack scores based on suspiciousness scores, determining module 110 may calculate an attack score for an event-correlation graph based on the size of the event-correlation graph. For example, determining module 110 may calculate an attack score for an event-correlation graph based on the number of actors and/or suspicious events represented in the event-correlation graph. Additionally or alternatively, determining module 110 may calculate an attack score for an event-correlation graph based on the number of nodes and/or edges in the event-correlation graph.

In some instances, it may be possible that benign actors, benign events, and/or actors and/or events that are not part of an attack may become part of an event-correlation graph. Determining module 110 may address this issue by pruning actors and/or events from the event-correlation graph. In one example, determining module 110 may prune actors and/or events from an event correlation graph based on adjusted suspiciousness scores associated with the actors and/or events. For example, determining module 110 may remove an actor or an event from an event-correlation graph if the suspiciousness score associated with the actor or event was not adjusted by more than a predetermined threshold. Using FIGS. 11 and 13 as an example, determining module 110 may remove, from event-correlation graph 1100 in FIG. 11, the actors represented by nodes 412, 418, 422, 426, 432, and 434 and the suspicious events represented by directed edges 444, 454, 456, 460, 464, 470, 472, and 474.

At step 1204, one or more of the systems described herein may determine that the attack score is greater than a predetermined threshold. For example, determining module 110 may, as part of server 206 in FIG. 2, determine that the attack score for event-correlation graph 230 is greater than a predetermined threshold.

Determining module 110 may determine that an attack score is greater than a predetermined threshold in any suitable manner. In one example, determining module 110 may determine that an attack score is greater than a predetermined threshold that was provided by an administrator or a user of a computing system. In another example, determining module 110 may determine that the attack score is greater than a predetermined threshold that is based on the attack scores of other event-correlation graphs. For example, determining module 110 may determine that the attack score is greater than an average attack score and/or determine that the attack score is greater than the attack scores of a predetermined percentage of other event-correlation graphs. By using a threshold based on other event-correlation graphs, determining module 110 may identify only event-correlation graphs that are most likely to be part of an attack on a computing system.

At step 1206, one or more of the systems described herein may determine, based at least in part on the attack score being greater than the predetermined threshold, that the suspicious event may be part of an attack on the computing system. For example, determining module 110 may, as part of server 206 in FIG. 2, determine that suspicious event 222 may be part of an attack on computing device 202(1) based at least in part on the attack score of event-correlation graph 230 being greater than a predetermined threshold. Using FIG. 11 as another example, determining module 110 may, as part of server 206 in FIG. 2, determine that the actors and/or suspicious events represented within event-correlation graph 1100 may be part of an attack on a computing system based at least in part on an attack score of event-correlation graph 1100 being greater than a predetermined threshold.

At step 1208, one or more of the systems described herein may report the attack on the computing system. For example, reporting module 112 may, as part of server 206 in FIG. 2, report the attack on computing device 202(1).

Reporting module 112 may report an attack on a computing system in any suitable manner. In some examples, reporting module 112 may report an attack on a computing system by generating and displaying a graphical representation of an event-correlation graph to an administrator or user of the computing system such that the administrator or user may analyze the attack represented by the event-correlation graph. In some examples, the systems described herein may label nodes and edges within an event-correlation graph with information about the actors and/or the suspicious events that they represent (e.g., adjusted suspiciousness scores). By presenting a graphical representation of an event-correlation graph, reporting module 112 may provide forensic information about the context within which an attack occurs.

In some examples, reporting module 112 may report an attack on a computing system by emphasizing the actors and/or suspicious events that were significant factors in the attack and/or by de-emphasizing the actors and/or suspicious events that played an insignificant factor in the attack. In at least one example, reporting module 112 may determine whether an actor or suspicious event was a significant factor in an attack by determining whether the suspiciousness score of the actor or suspicious event was adjusted by more than a predetermined threshold. In some examples, reporting module 112 may emphasize an actor or suspicious event by including the actor or suspicious event in a report of an attack and may de-emphasize an actor or suspicious event by excluding the actor or suspicious event from a report of an attack. In at least one example, event-correlation graph 1300 may represent a report of an attack on a computing system in which actors and/or suspicious events that were significant factors in the attack have been emphasized and actors and/or suspicious events that were not significant factors in the attack have been de-emphasized. Upon completion of step 1208, exemplary method 1200 in FIG. 12 may terminate.

As explained above, by adjusting the suspiciousness scores of the actors and/or suspicious events represented in an event-correlation graph based on how the actors and/or suspicious events are interconnected, the systems and methods described herein may improve the detection and understanding of a targeted attack captured by the event-correlation graph. Furthermore, in some examples, by determining the degree to which the suspiciousness score of an actor and/or suspicious event represented in an event-correlation graph is adjusted, these systems and methods may determine whether the actor or suspicious event may have been a significant factor in the targeted attack. In one example, once an event-correlation graph (or an "attack graph") is generated, the systems described herein may apply a belief-propagation algorithm to the event-correlation graph to adjust the suspiciousness scores associated with the actors and/or suspicious events represented in the event-correlation graph to reflect contextual information represented in the event-correlation graph. These systems may then use the event-correlation graph with adjusted suspiciousness scores to detect an attack on a computing system. In some examples, these systems may also generate a report of the attack on the computing system that includes information about the actors and/or suspicious events that may have been significant factors in the attack.

Figure 14:
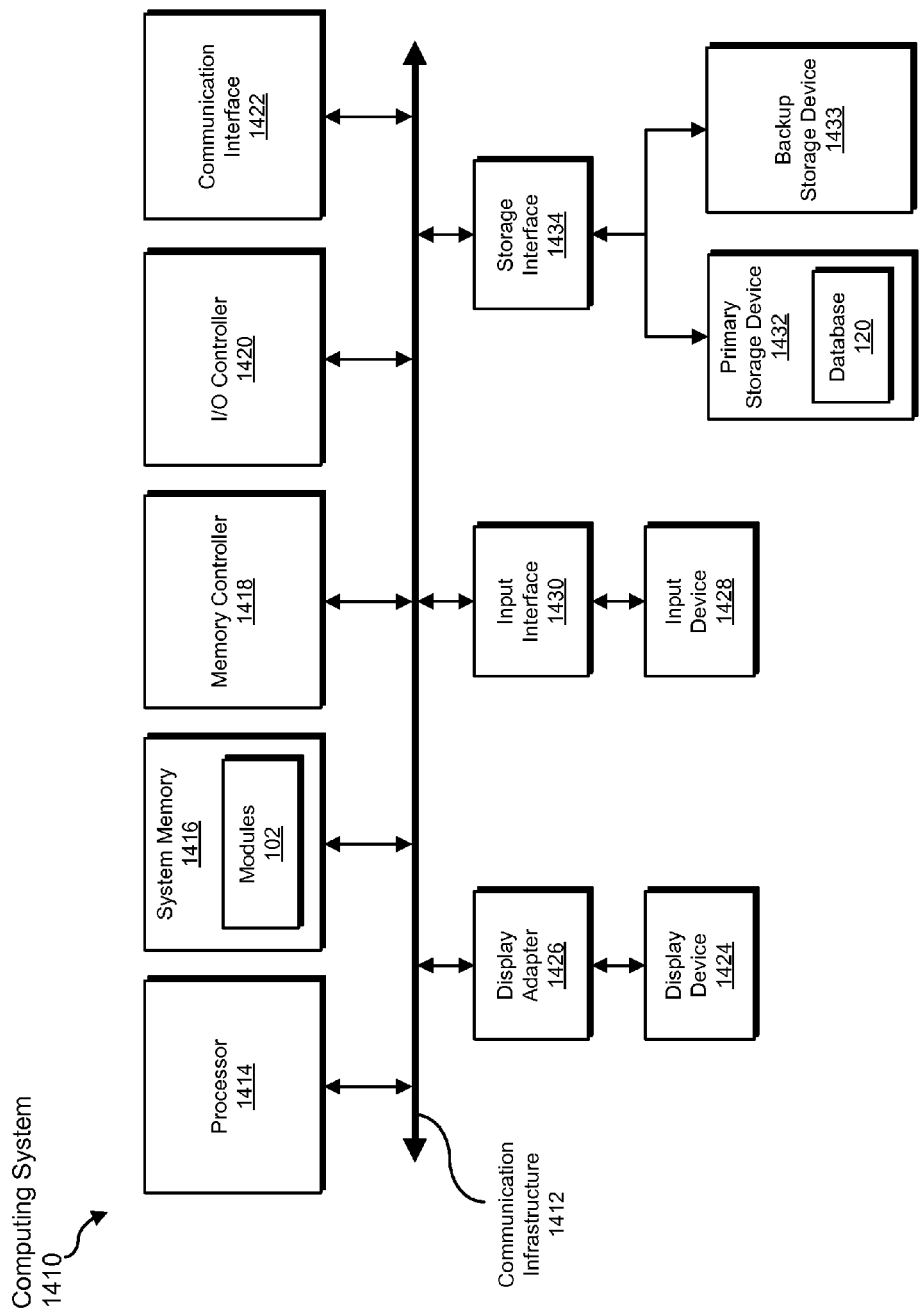
FIG. 14 is a block diagram of an exemplary computing system capable of implementing one or more of the embodiments described and/or illustrated herein.

FIG. 14 is a block diagram of an exemplary computing system 1410 capable of implementing one or more of the embodiments described and/or illustrated herein. For example, all or a portion of computing system 1410 may perform and/or be a means for performing, either alone or in combination with other elements, one or more of the steps described herein (such as one or more of the steps illustrated in FIG. 3). All or a portion of computing system 1410 may also perform and/or be a means for performing any other steps, methods, or processes described and/or illustrated herein.

Computing system 1410 broadly represents any single or multi-processor computing device or system capable of executing computer-readable instructions. Examples of computing system 1410 include, without limitation, workstations, laptops, client-side terminals, servers, distributed computing systems, handheld devices, or any other computing system or device. In its most basic configuration, computing system 1410 may include at least one processor 1414 and a system memory 1416.

Processor 1414 generally represents any type or form of physical processing unit (e.g., a hardware-implemented central processing unit) capable of processing data or interpreting and executing instructions. In certain embodiments, processor 1414 may receive instructions from a software application or module. These instructions may cause processor 1414 to perform the functions of one or more of the exemplary embodiments described and/or illustrated herein.

System memory 1416 generally represents any type or form of volatile or non-volatile storage device or medium capable of storing data and/or other computer-readable instructions. Examples of system memory 1416 include, without limitation, Random Access Memory (RAM), Read Only Memory (ROM), flash memory, or any other suitable memory device. Although not required, in certain embodiments computing system 1410 may include both a volatile memory unit (such as, for example, system memory 1416) and a non-volatile storage device (such as, for example, primary storage device 1432, as described in detail below). In one example, one or more of modules 102 from FIG. 1 may be loaded into system memory 1416.

In certain embodiments, exemplary computing system 1410 may also include one or more components or elements in addition to processor 1414 and system memory 1416. For example, as illustrated in FIG. 14, computing system 1410 may include a memory controller 1418, an Input/Output (I/O) controller 1420, and a communication interface 1422, each of which may be interconnected via a communication infrastructure 1412. Communication infrastructure 1412 generally represents any type or form of infrastructure capable of facilitating communication between one or more components of a computing device. Examples of communication infrastructure 1412 include, without limitation, a communication bus (such as an Industry Standard Architecture (ISA), Peripheral Component Interconnect (PCI), PCI Express (PCIe), or similar bus) and a network.

Memory controller 1418 generally represents any type or form of device capable of handling memory or data or controlling communication between one or more components of computing system 1410. For example, in certain embodiments memory controller 1418 may control communication between processor 1414, system memory 1416, and I/O controller 1420 via communication infrastructure 1412.

I/O controller 1420 generally represents any type or form of module capable of coordinating and/or controlling the input and output functions of a computing device. For example, in certain embodiments I/O controller 1420 may control or facilitate transfer of data between one or more elements of computing system 1410, such as processor 1414, system memory 1416, communication interface 1422, display adapter 1426, input interface 1430, and storage interface 1434.

Communication interface 1422 broadly represents any type or form of communication device or adapter capable of facilitating communication between exemplary computing system 1410 and one or more additional devices. For example, in certain embodiments communication interface 1422 may facilitate communication between computing system 1410 and a private or public network including additional computing systems. Examples of communication interface 1422 include, without limitation, a wired network interface (such as a network interface card), a wireless network interface (such as a wireless network interface card), a modem, and any other suitable interface. In at least one embodiment, communication interface 1422 may provide a direct connection to a remote server via a direct link to a network, such as the Internet. Communication interface 1422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1422 may also represent a host adapter configured to facilitate communication between computing system 1410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1422 may also allow computing system 1410 to engage in distributed or remote computing. For example, communication interface 1422 may receive instructions from a remote device or send instructions to a remote device for execution.

As illustrated in FIG. 14, computing system 1410 may also include at least one display device 1424 coupled to communication infrastructure 1412 via a display adapter 1426. Display device 1424 generally represents any type or form of device capable of visually displaying information forwarded by display adapter 1426. Similarly, display adapter 1426 generally represents any type or form of device configured to forward graphics, text, and other data from communication infrastructure 1412 (or from a frame buffer, as known in the art) for display on display device 1424.

As illustrated in FIG. 14, exemplary computing system 1410 may also include at least one input device 1428 coupled to communication infrastructure 1412 via an input interface 1430. Input device 1428 generally represents any type or form of input device capable of providing input, either computer or human generated, to exemplary computing system 1410. Examples of input device 1428 include, without limitation, a keyboard, a pointing device, a speech recognition device, or any other input device.

As illustrated in FIG. 14, exemplary computing system 1410 may also include a primary storage device 1432 and a backup storage device 1433 coupled to communication infrastructure 1412 via a storage interface 1434. Storage devices 1432 and 1433 generally represent any type or form of storage device or medium capable of storing data and/or other computer-readable instructions. For example, storage devices 1432 and 1433 may be a magnetic disk drive (e.g., a so-called hard drive), a solid state drive, a floppy disk drive, a magnetic tape drive, an optical disk drive, a flash drive, or the like. Storage interface 1434 generally represents any type or form of interface or device for transferring data between storage devices 1432 and 1433 and other components of computing system 1410. In one example, database 120 from FIG. 1 may be stored in primary storage device 1432.

In certain embodiments, storage devices 1432 and 1433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1432 and 1433 may also include other similar structures or devices for allowing computer software, data, or other computer-readable instructions to be loaded into computing system 1410. For example, storage devices 1432 and 1433 may be configured to read and write software, data, or other computer-readable information. Storage devices 1432 and 1433 may also be a part of computing system 1410 or may be a separate device accessed through other interface systems.

Many other devices or subsystems may be connected to computing system 1410. Conversely, all of the components and devices illustrated in FIG. 14 need not be present to practice the embodiments described and/or illustrated herein. The devices and subsystems referenced above may also be interconnected in different ways from that shown in FIG. 14. Computing system 1410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1410. All or a portion of the computer program stored on the computer-readable medium may then be stored in system memory 1416 and/or various portions of storage devices 1432 and 1433.

When executed by processor 1414, a computer program loaded into computing system 1410 may cause processor 1414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1410 may be configured as an Application Specific Integrated Circuit (ASIC) adapted to implement one or more of the exemplary embodiments disclosed herein.

Figure 15:
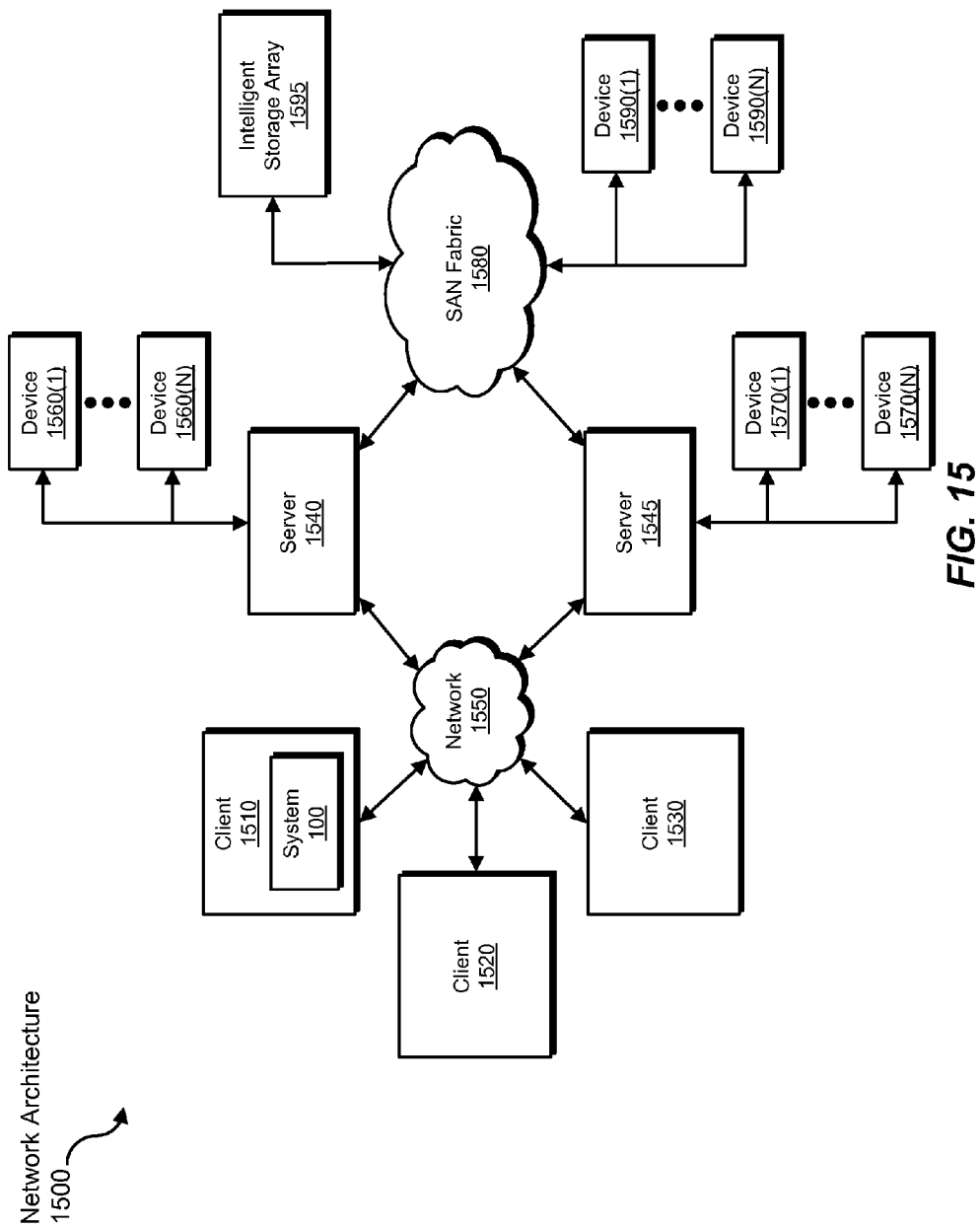
FIG. 15 is a block diagram of an exemplary computing network capable of implementing one or more of the embodiments described and/or illustrated herein.

FIG. 15 is a block diagram of an exemplary network architecture 1500 in which client systems 1510, 1520, and 1530 and servers 1540 and 1545 may be coupled to a network 1550. As detailed above, all or a portion of network architecture 1500 may perform and/or be a means for performing, either alone or in combination with other elements, one or more of the steps disclosed herein (such as one or more of the steps illustrated in FIG. 3). All or a portion of network architecture 1500 may also be used to perform and/or be a means for performing other steps and features set forth in the instant disclosure.

Client systems 1510, 1520, and 1530 generally represent any type or form of computing device or system, such as exemplary computing system 1410 in FIG. 14. Similarly, servers 1540 and 1545 generally represent computing devices or systems, such as application servers or database servers, configured to provide various database services and/or run certain software applications. Network 1550 generally represents any telecommunication or computer network including, for example, an intranet, a WAN, a LAN, a PAN, or the Internet. In one example, client systems 1510, 1520, and/or 1530 and/or servers 1540 and/or 1545 may include all or a portion of system 100 from FIG. 1.

As illustrated in FIG. 15, one or more storage devices 1560(1)-(N) may be directly attached to server 1540. Similarly, one or more storage devices 1570(1)-(N) may be directly attached to server 1545. Storage devices 1560(1)-(N) and storage devices 1570(1)-(N) generally represent any type or form of storage device or medium capable of storing data and/or other computer-readable instructions. In certain embodiments, storage devices 1560(1)-(N) and storage devices 1570(1)-(N) may represent Network-Attached Storage (NAS) devices configured to communicate with servers 1540 and 1545 using various protocols, such as Network File System (NFS), Server Message Block (SMB), or Common Internet File System (CIFS).

Servers 1540 and 1545 may also be connected to a Storage Area Network (SAN) fabric 1580. SAN fabric 1580 generally represents any type or form of computer network or architecture capable of facilitating communication between a plurality of storage devices. SAN fabric 1580 may facilitate communication between servers 1540 and 1545 and a plurality of storage devices 1590(1)-(N) and/or an intelligent storage array 1595. SAN fabric 1580 may also facilitate, via network 1550 and servers 1540 and 1545, communication between client systems 1510, 1520, and 1530 and storage devices 1590(1)-(N) and/or intelligent storage array 1595 in such a manner that devices 1590(1)-(N) and array 1595 appear as locally attached devices to client systems 1510, 1520, and 1530. As with storage devices 1560(1)-(N) and storage devices 1570(1)-(N), storage devices 1590(1)-(N) and intelligent storage array 1595 generally represent any type or form of storage device or medium capable of storing data and/or other computer-readable instructions.

In certain embodiments, and with reference to exemplary computing system 1410 of FIG. 14, a communication interface, such as communication interface 1422 in FIG. 14, may be used to provide connectivity between each client system 1510, 1520, and 1530 and network 1550. Client systems 1510, 1520, and 1530 may be able to access information on server 1540 or 1545 using, for example, a web browser or other client software. Such software may allow client systems 1510, 1520, and 1530 to access data hosted by server 1540, server 1545, storage devices 1560(1)-(N), storage devices 1570(1)-(N), storage devices 1590(1)-(N), or intelligent storage array 1595. Although FIG. 15 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1540, server 1545, storage devices 1560(1)-(N), storage devices 1570(1)-(N), storage devices 1590(1)-(N), intelligent storage array 1595, or any combination thereof. All or a portion of one or more of the exemplary embodiments disclosed herein may also be encoded as a computer program, stored in server 1540, run by server 1545, and distributed to client systems 1510, 1520, and 1530 over network 1550.

As detailed above, computing system 1410 and/or one or more components of network architecture 1500 may perform and/or be a means for performing, either alone or in combination with other elements, one or more steps of an exemplary method for adjusting suspiciousness scores in event-correlation graphs.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event-correlation graphs to be transformed, transform the event-correlation graphs into determinations about possible attacks, output the determinations about possible attacks to an administrator, use the result of the transformation to interrupt or allow an application to execute, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for adjusting suspiciousness scores in event-correlation graphs, at least a portion of the method being performed by a computing device comprising at least one processor, the method comprising:
   detecting a suspicious event involving a first actor and a second actor within a computing system, wherein the suspicious event could not be individually classified as definitively malicious;
   constructing, after the suspicious event involving the first actor and the second actor is detected, an event-correlation graph, wherein the event-correlation graph comprises at least:
      a representation of the first actor;
      a representation of the suspicious event, wherein the representation of the suspicious event and the representation of the first actor are interconnected;
      a representation of the second actor, wherein the representation of the second actor and the representation of the suspicious event are interconnected;
      a representation of an additional suspicious event involving the first actor and an additional actor;
      a representation of the additional actor, wherein:
         the representation of the first actor and the representation of the additional suspicious event are interconnected;
         the representation of the additional actor and the representation of the additional suspicious event are interconnected;
         the additional suspicious event could not be individually classified as definitively malicious;
         each suspicious event represented in the event-correlation graph could not be individually classified as definitively malicious;
   adjusting a suspiciousness score associated with at least one of an actor represented in the event-correlation graph and a suspicious event represented in the event-correlation graph based at least in part on a suspiciousness score associated with at least one other actor or suspicious event represented in the event-correlation graph such that the adjusted suspiciousness score is influenced by the suspiciousness score associated with the at least one other actor or suspicious event.

2. The computer-implemented method of claim 1, wherein:
   the representation of the first actor is associated with a suspiciousness score of the first actor that indicates a likelihood that the first actor is malicious;
   the representation of the suspicious event is associated with a suspiciousness score of the suspicious event that indicates a likelihood that the suspicious event is malicious;
   the representation of the second actor is associated with a suspiciousness score of the second actor that indicates a likelihood that the second actor is malicious.

3. The computer-implemented method of claim 1, wherein:
   the representation of the first actor comprises a first node;
   the representation of the suspicious event comprises a second node;
   the representation of the second actor comprises a third node;
   the first node and the second node are interconnected by a first edge;
   the second node and the third node are interconnected by a second edge.

4. The computer-implemented method of claim 3, wherein adjusting the suspiciousness score comprises:
   determining a prior probability distribution for each node in the event-correlation graph based at least in part on the suspiciousness score associated with the node for which the prior probability distribution is determined;
   iteratively propagating a probability among the nodes in the event-correlation graph that indicates whether the actor or suspicious event represented by the node is malicious by transmitting messages along the edges in the event-correlation graph, wherein a message transmitted by a transmitting node is generated based at least in part on the prior probability distribution of the transmitting node and messages received by the transmitting node from other nodes in the event-correlation graph during any previous iterations;
   adjusting the suspiciousness score associated with the node based at least in part on the probability that indicates whether the actor or suspicious event represented by the node is malicious.

5. The computer-implemented method of claim 4, further comprising
   determining an edge potential for each edge in the event-correlation graph based at least in part on at least one of:
      a probability that a malicious actor exists within a computing environment within which malware is prevented;
      a probability that a benign actor exists within the computing environment within which malware is prevented;
      a probability that a malicious event occurs within the computing environment within which malware is prevented;
      a probability that a benign event occurs within the computing environment within which malware is prevented;
      a probability that a malicious actor exists within a computing environment within which malware is not prevented;
      a probability that a benign actor exists within the computing environment within which malware is not prevented;
      a probability that a malicious event occurs within the computing environment within which malware is not prevented;
      a probability that a benign event occurs within the computing environment within which malware is not prevented, wherein the message transmitted by the transmitting node is generated based at least in part on the edge potential of the edge in the event-correlation graph along which the transmitting node transmits the message.

6. The computer-implemented method of claim 1, wherein adjusting the suspiciousness score comprises applying a belief-propagation algorithm to the event-correlation graph.

7. The computer-implemented method of claim 1, further comprising:
   calculating, based at least in part on the adjusted suspiciousness score, an attack score for the event-correlation graph;
   determining that the attack score is greater than a predetermined threshold;
   determining, based at least in part on the attack score being greater than the predetermined threshold, that the suspicious event comprises an attack on the computing system;
   reporting the attack on the computing system.

8. The computer-implemented method of claim 7, wherein reporting the attack on the computing system comprises:
   determining, based at least in part on the adjusted suspiciousness score, that the actor or the suspicious event associated with the adjusted suspiciousness score was a significant factor in the attack on the computing system;

emphasizing the actor or the suspicious event associated with the adjusted suspiciousness score based at least in part on the actor or the suspicious event associated with the adjusted suspiciousness score having been a significant factor in the attack on the computing system.

9. The computer-implemented method of claim 8, wherein determining that the actor or the suspicious event associated with the adjusted suspiciousness score was a significant factor in the attack on the computing system comprises determining that the adjusted suspiciousness score was adjusted by more than an additional predetermined threshold.

10. The computer-implemented method of claim 7, wherein reporting the attack on the computing system comprises:

determining, based at least in part on the adjusted suspiciousness score associated with the at least one representation, that the actor or the suspicious event associated with the adjusted suspiciousness score was not a significant factor in the attack on the computing system;

de-emphasizing the actor or the suspicious event associated with the adjusted suspiciousness score based at least in part on the actor or the suspicious event associated with the adjusted suspiciousness score not having been a significant factor in the attack on the computing system.

11. The computer-implemented method of claim 1, wherein adjusting the suspiciousness score comprises applying a heat-diffusion algorithm to the event-correlation graph.

12. The computer-implemented method of claim 1, wherein adjusting the suspiciousness score comprises applying a label-propagation algorithm to the event-correlation graph.

13. The computer-implemented method of claim 1, wherein constructing the event-correlation graph comprises, for each actor represented within the event-correlation graph:

identifying a set of events that involve the actor and at least one other actor;

for each event within the set of events:

adding a representation of the other actor to the event-correlation graph;

adding a representation of the event to the event-correlation graph, wherein:

the representation of the actor and the representation of the event are interconnected;

the representation of the event and the representation of the other actor are interconnected.

14. The computer-implemented method of claim 13, wherein the set of events comprises a set of suspicious events.

15. A system for adjusting suspiciousness scores in event-correlation graphs, the system comprising:

a detecting module, stored in memory, that detects a suspicious event involving a first actor and a second actor within a computing system, wherein the suspicious event could not be individually classified as definitively malicious;

a constructing module, stored in memory, that constructs, after the suspicious event involving the first actor and the second actor is detected, an event-correlation graph, wherein the event-correlation graph comprises at least:

a representation of the first actor;

a representation of the suspicious event, wherein the representation of the suspicious event and the representation of the first actor are interconnected;

a representation of the second actor, wherein the representation of the second actor and the representation of the suspicious event are interconnected;

a representation of an additional suspicious event involving the first actor and an additional actor;

a representation of the additional actor, wherein:

the representation of the first actor and the representation of the additional suspicious event are interconnected;

the representation of the additional actor and the representation of the additional suspicious event are interconnected;

the additional suspicious event could not be individually classified as definitively malicious;

each suspicious event represented in the event-correlation graph could not be individually classified as definitively malicious;

an adjusting module, stored in memory, that adjusts a suspiciousness score associated with at least one of an actor represented in the event-correlation graph and a suspicious event represented in the event-correlation graph based at least in part on a suspiciousness score associated with at least one other actor or suspicious event represented in the event-correlation graph such that the adjusted suspiciousness score is influenced by the suspiciousness score associated with the at least one other actor or suspicious event;

at least one physical processor that executes the detecting module, the constructing module, and the adjusting module.

16. The system of claim 15, wherein:

the representation of the first actor is associated with a suspiciousness score of the first actor that indicates a likelihood that the first actor is malicious;

the representation of the suspicious event is associated with a suspiciousness score of the suspicious event that indicates a likelihood that the suspicious event is malicious;

the representation of the second actor is associated with a suspiciousness score of the second actor that indicates a likelihood that the second actor is malicious.

17. The system of claim 15, wherein:

the representation of the first actor comprises a first node;

the representation of the suspicious event comprises a second node;

the representation of the second actor comprises a third node;

the first node and the second node are interconnected by a first edge;

the second node and the third node are interconnected by a second edge.

18. The system of claim 17, wherein the adjusting module adjusts the suspiciousness score by:

determining a prior probability distribution for each node in the event-correlation graph based at least in part on the suspiciousness score associated with the node for which the prior probability distribution is determined;

iteratively propagating a probability among the nodes in the event-correlation graph that indicates whether the actor or suspicious event represented by the node is malicious by transmitting messages along the edges in the event-correlation graph, wherein a message transmitted by a transmitting node is generated based at least in part on the prior probability distribution of the transmitting node and messages received by the transmitting node from other nodes in the event-correlation graph during any previous iterations;

adjusting the suspiciousness score associated with the node based at least in part on the probability that indicates whether the actor or suspicious event represented by the node is malicious.

19. The system of claim 15, wherein the adjusting module adjusts the suspiciousness score by applying a belief-propagation algorithm to the event-correlation graph.

20. A non-transitory computer-readable medium comprising one or more computer-executable instructions that, when executed by at least one processor of a computing device, cause the computing device to:
 detect a suspicious event involving a first actor and a second actor within a computing system, wherein the suspicious event could not be individually classified as definitively malicious;
 construct, after the suspicious event involving the first actor and the second actor is detected, an event-correlation graph, wherein the event-correlation graph comprises at least:
  a representation of the first actor;
  a representation of the suspicious event, wherein the representation of the suspicious event and the representation of the first actor are interconnected;
  a representation of the second actor, wherein the representation of the second actor and the representation of the suspicious event are interconnected;
  a representation of an additional suspicious event involving the first actor and an additional actor;
  a representation of the additional actor, wherein:
   the representation of the first actor and the representation of the additional suspicious event are interconnected;
   the representation of the additional actor and the representation of the additional suspicious event are interconnected;
   the additional suspicious event could not be individually classified as definitively malicious;
   each suspicious event represented in the event-correlation graph could not be individually classified as definitively malicious;
 adjust a suspiciousness score associated with at least one of an actor represented in the event-correlation graph and a suspicious event represented in the event-correlation graph based at least in part on a suspiciousness score associated with at least one other actor or suspicious event represented in the event-correlation graph such that the adjusted suspiciousness score is influenced by the suspiciousness score associated with the at least one other actor or suspicious event.

* * * * *